(12) United States Patent
Wu et al.

(10) Patent No.: US 6,799,752 B2
(45) Date of Patent: *Oct. 5, 2004

(54) METHOD AND APPARATUS FOR IMPROVING A FRACTIONATION PROCESS

(75) Inventors: Kuang Wu, Plano, TX (US); Fred Tahmassi, Carrollton, TX (US); Adam T. Lee, Dallas, TX (US)

(73) Assignee: AMT International, Inc., Richardson, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/848,975

(22) Filed: May 3, 2001

(65) Prior Publication Data

US 2002/0163091 A1 Nov. 7, 2002

(51) Int. Cl.⁷ .................................. B01F 3/04
(52) U.S. Cl. ........................... 261/114.2; 261/114.4
(58) Field of Search ................. 261/114.1, 114.2, 261/114.4, 114.5

(56) References Cited

U.S. PATENT DOCUMENTS

| | | | | |
|---|---|---|---|---|
| 1,776,032 A | * | 9/1930 | Kobernik | 261/114.2 |
| 2,252,000 A | * | 8/1941 | Grunow | 29/428 |
| 2,718,900 A | * | 9/1955 | Nutter | 261/114.4 |
| 3,087,711 A | * | 4/1963 | Glitsch | 261/114.3 |
| 3,245,669 A | * | 4/1966 | Huggins et al. | 261/114.4 |
| 3,385,577 A | * | 5/1968 | Epstein | 261/114.4 |
| 3,491,987 A | * | 1/1970 | Eckert | 261/114.4 |
| 3,530,879 A | * | 9/1970 | Nutter | 261/114.4 |
| 3,608,875 A | * | 9/1971 | Kriegel | 261/114.4 |
| 3,693,948 A | * | 9/1972 | Kloss | 261/114.2 |
| 3,759,494 A | * | 9/1973 | Axelrod et al. | 261/114.4 |
| 5,547,617 A | * | 8/1996 | Lee et al. | 261/114.1 |
| 5,911,922 A | * | 6/1999 | Hauser et al. | 261/114.4 |
| 6,068,244 A | * | 5/2000 | Burton et al. | 261/114.4 |
| 6,145,816 A | * | 11/2000 | Chuang et al. | 261/114.4 |
| 6,189,872 B1 | * | 2/2001 | Chuang | 261/114.4 |
| 6,270,062 B1 | * | 8/2001 | Chuang et al. | 261/114.4 |

FOREIGN PATENT DOCUMENTS

| | | | | |
|---|---|---|---|---|
| CA | 624582 | * | 7/1961 | 261/114.4 |
| GB | 1026371 | * | 4/1966 | 261/114.4 |
| RU | 685301 | * | 9/1979 | 261/114.4 |
| RU | 713567 | * | 2/1980 | 261/114.4 |
| RU | 766609 | * | 9/1980 | 261/114.4 |
| RU | 967501 | * | 10/1982 | 261/114.4 |
| RU | 1604389 | * | 11/1990 | 261/114.4 |

* cited by examiner

Primary Examiner—Scott Bushey
(74) Attorney, Agent, or Firm—Baker Botts L.L.P.

(57) ABSTRACT

A method and apparatus for increasing fractionation capacity and efficiency within an existing distillation column having preexisting mass transfer surface structures with a multiplicity of openings for vapor-liquid contact is provided. Some embodiments of the present invention include microdispersers, either individually or in combination, installed to convert target areas of select openings to achieve an optimal column performance without resorting to a full or partial replacement of the preexisting mass transfer trays. A kit for assembling an increased capacity and efficiency fractionation tray including installation instructions, one or more fastening devices and microdispersing bubble promoters and valves is also disclosed. A system for increasing capacity and efficiency of preexisting trays within a preexisting column is shown whereby microdispersers are used in combination with a revamp of the downcomer structures or other existing structures. The microdispersers may also be used in the construction of new fractionation towers.

31 Claims, 21 Drawing Sheets

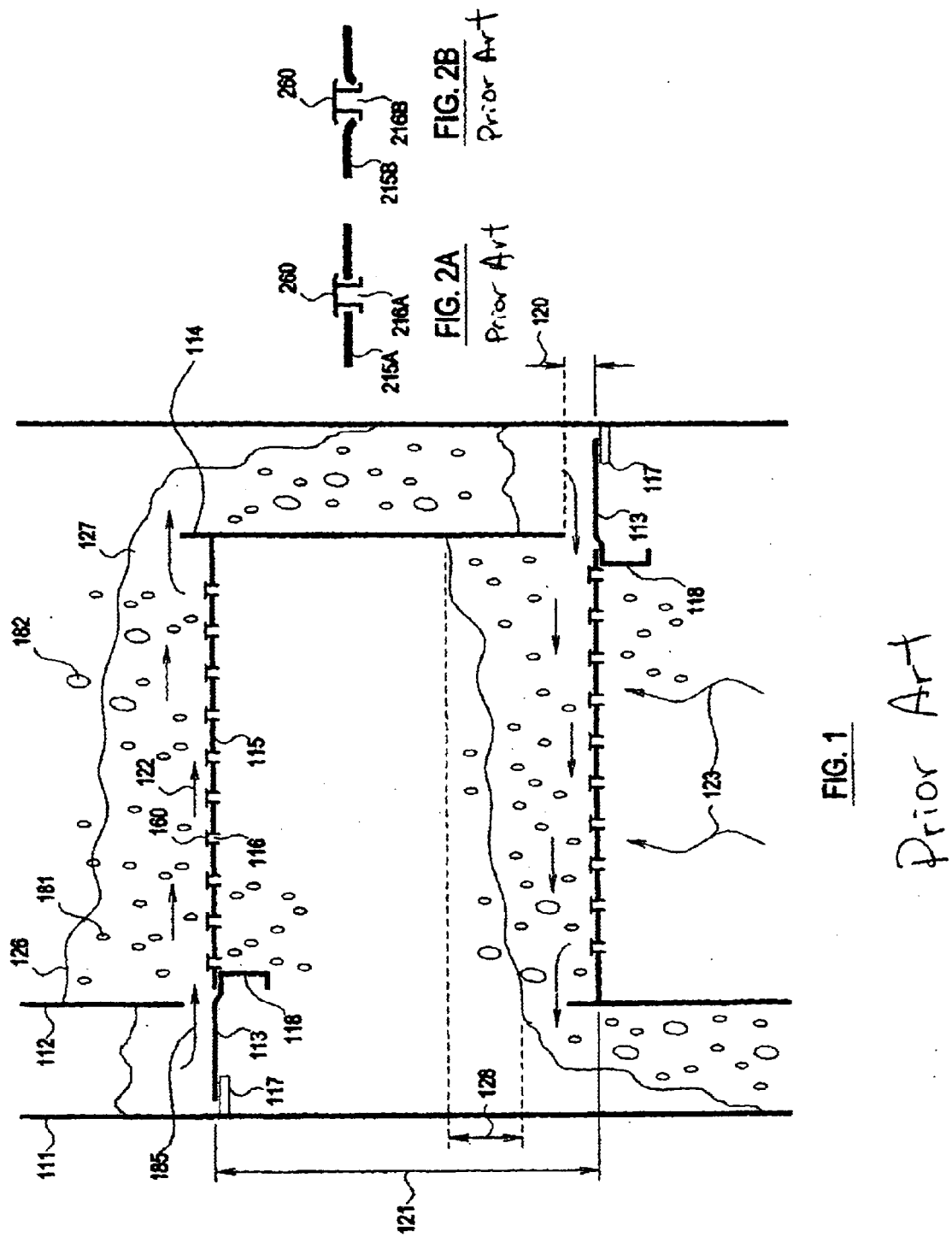

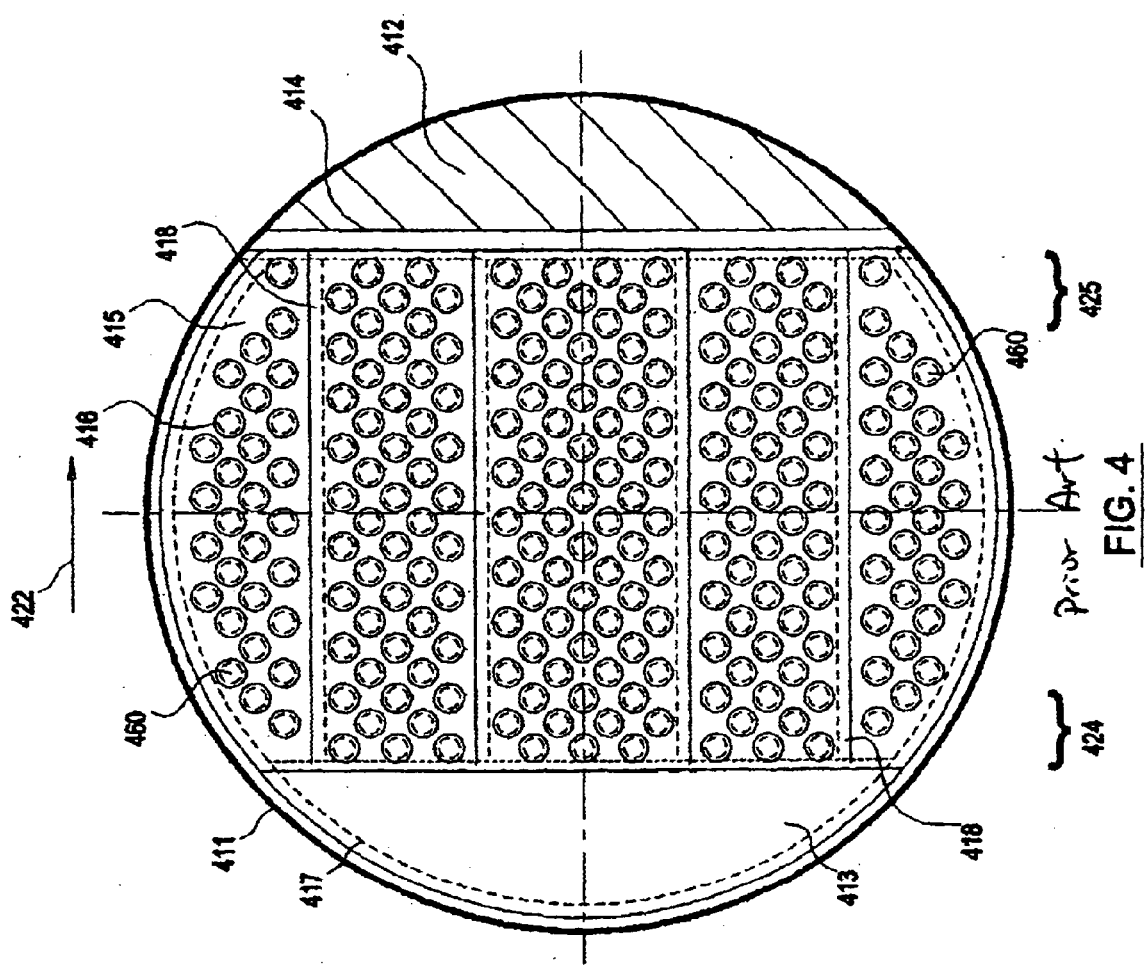

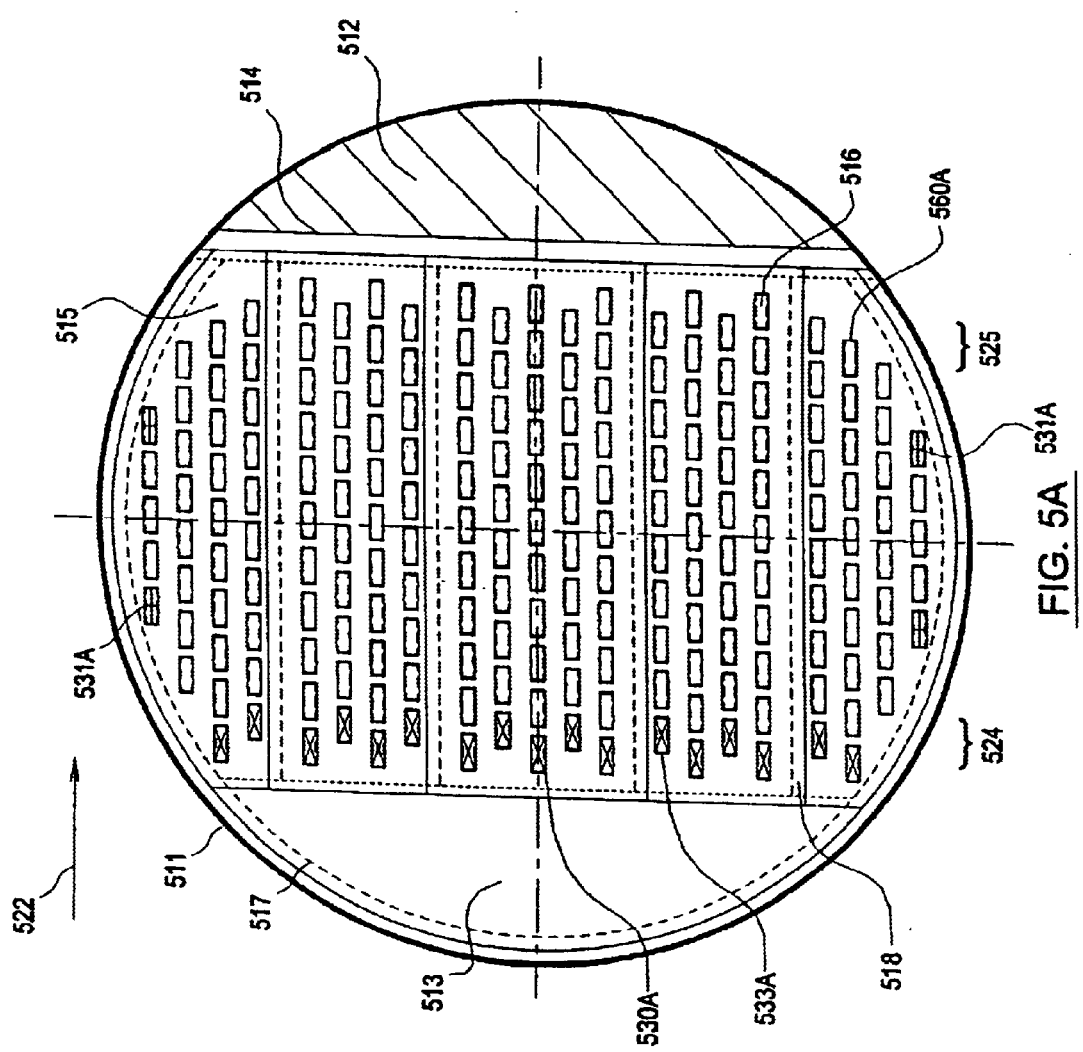

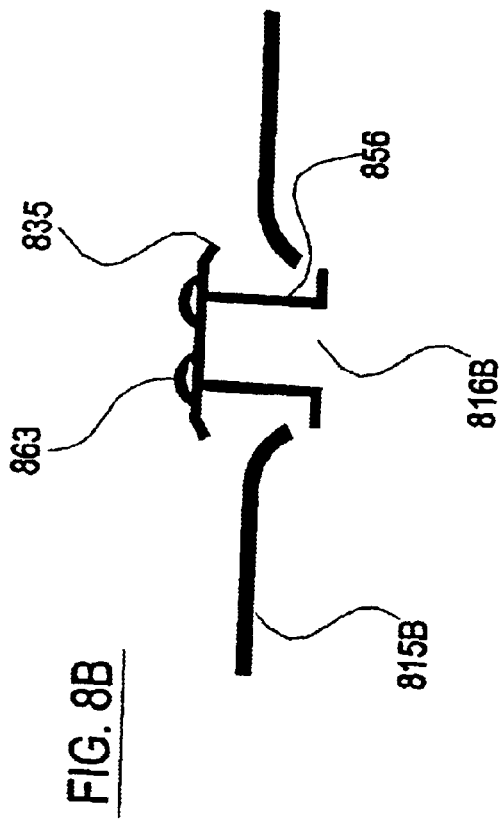
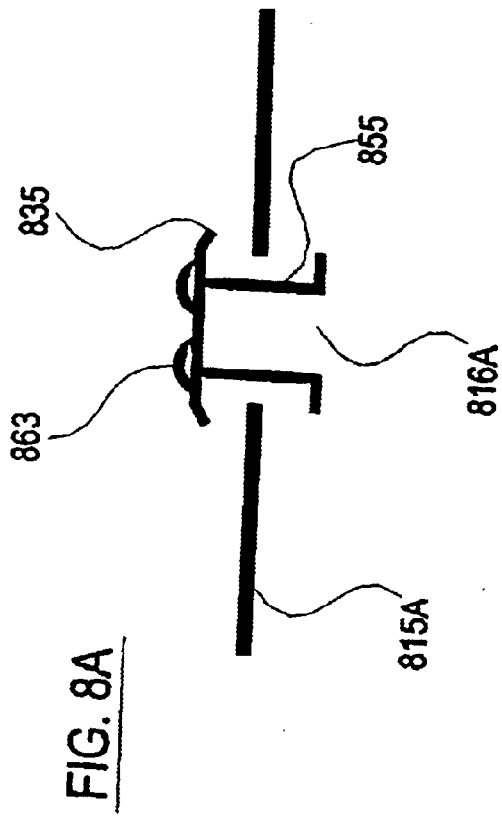

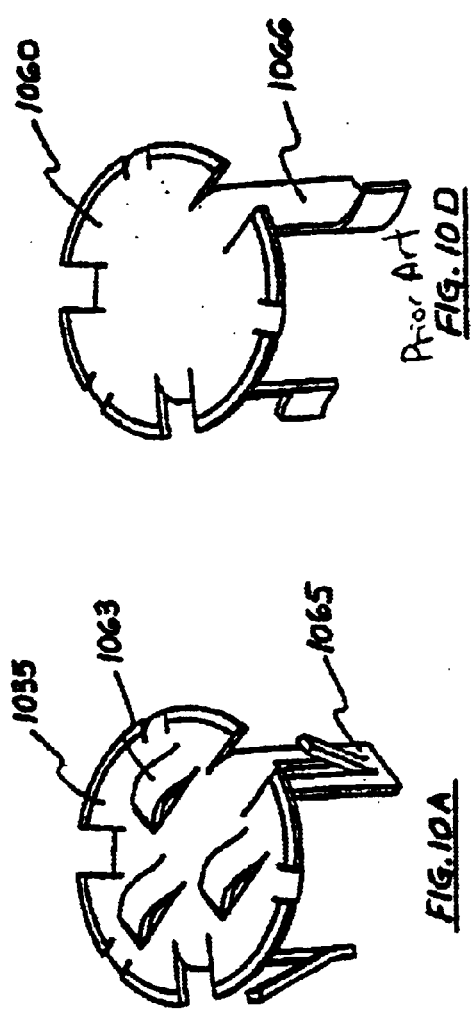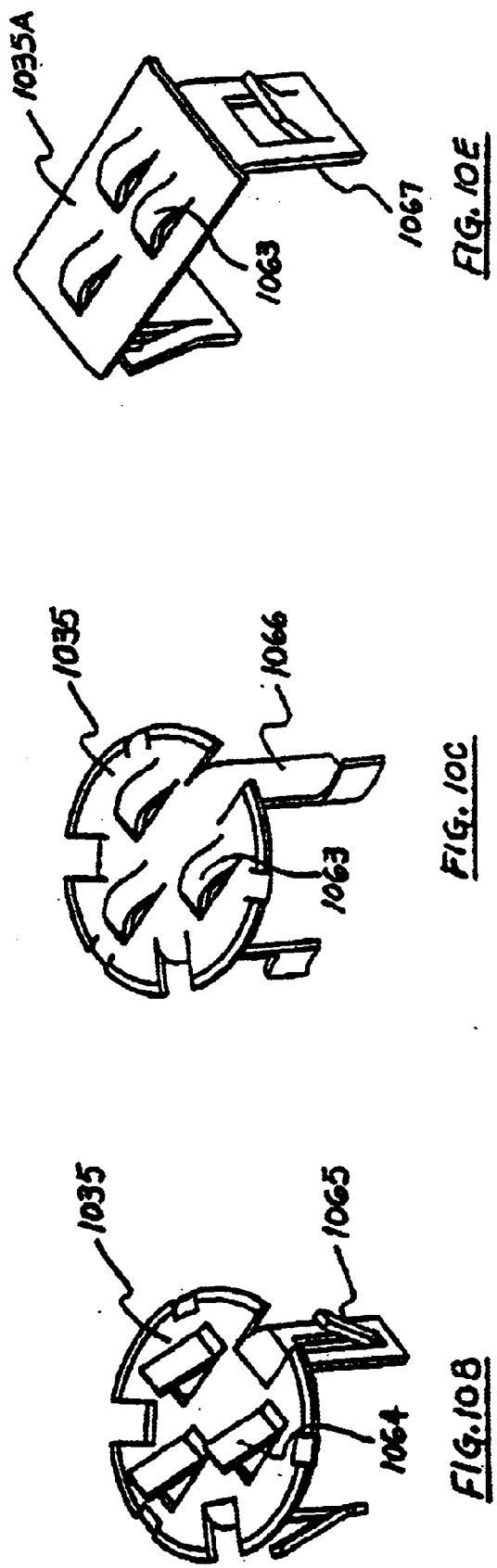

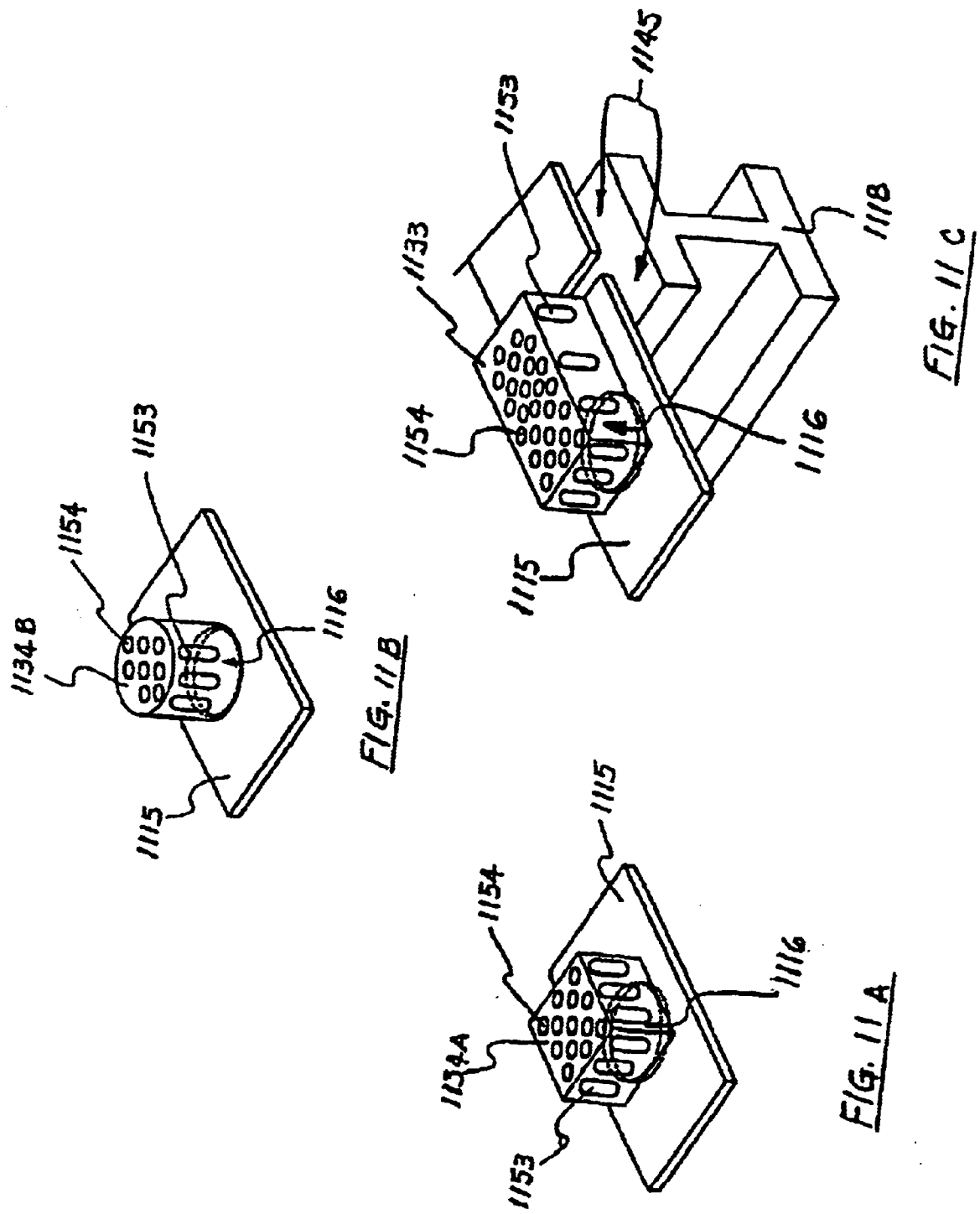

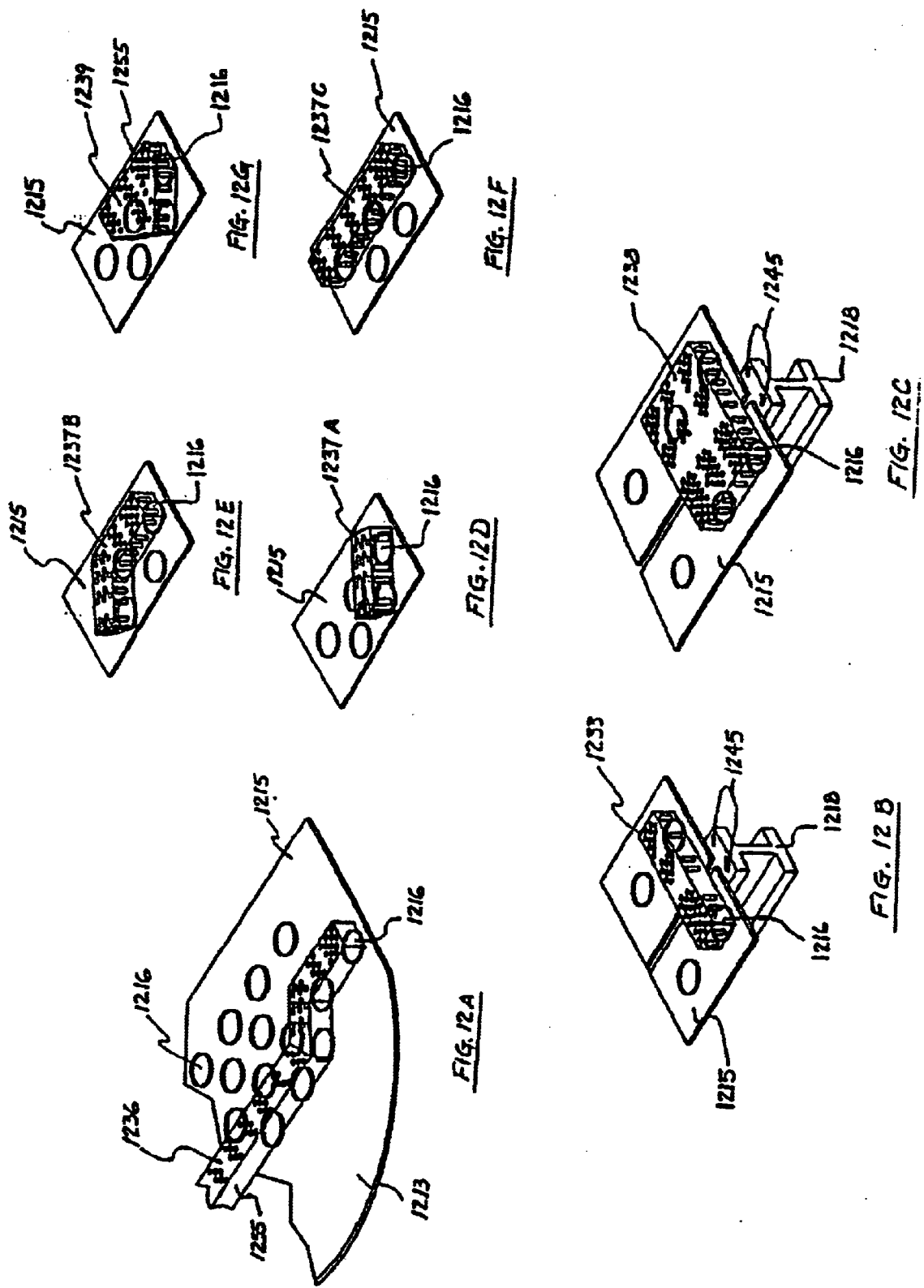

LIQUID FLOW DIRECTION

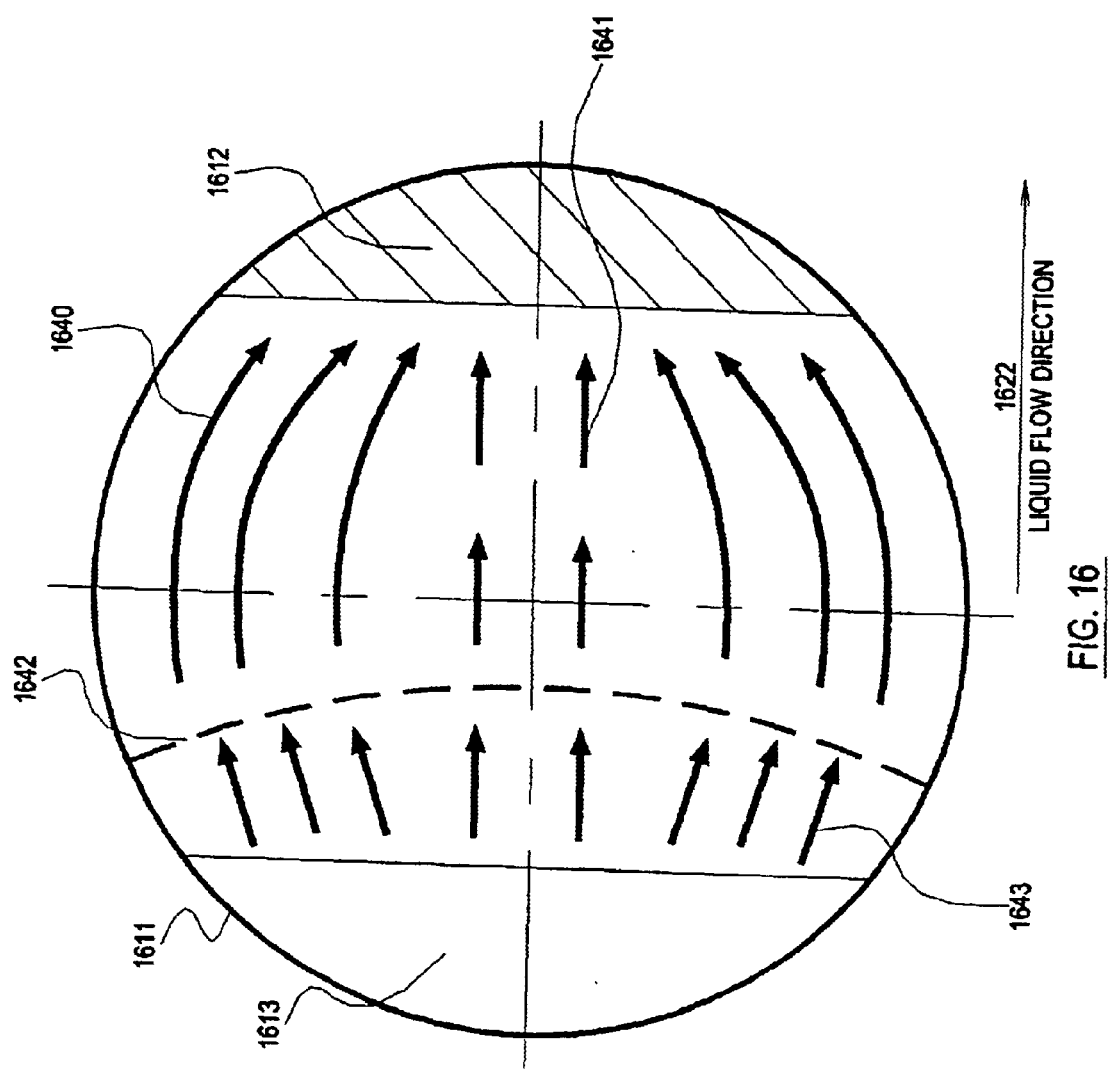

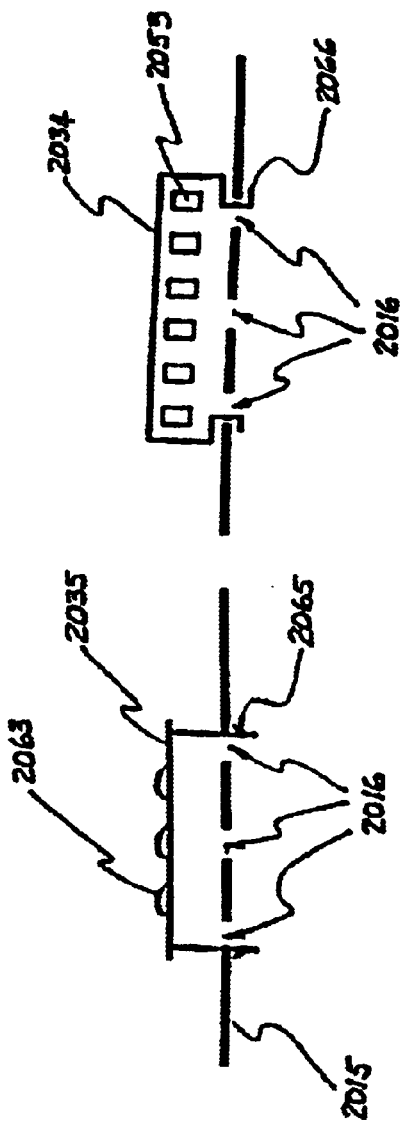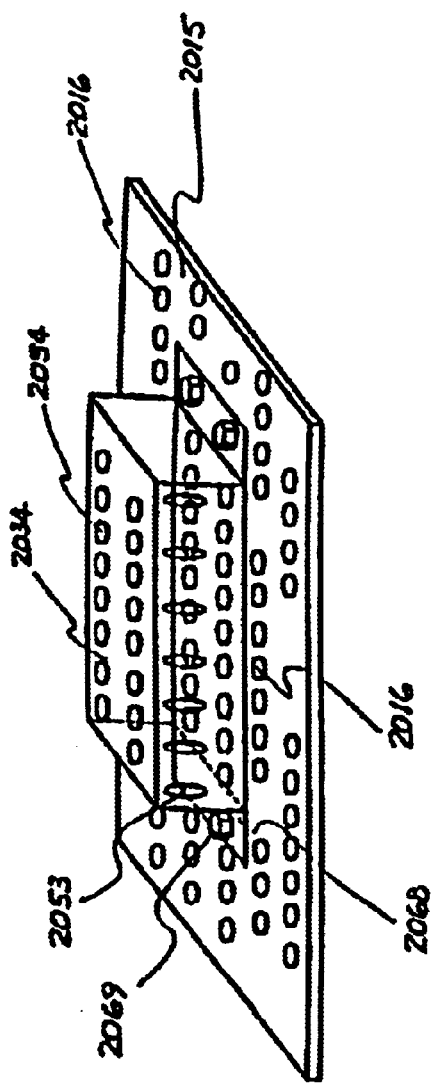
FIG. 20A
FIG. 20B

METHOD AND APPARATUS FOR IMPROVING A FRACTIONATION PROCESS

BACKGROUND OF THE INVENTION

1. Field of the Invention

This invention relates generally to a novel method and apparatus for improving a distillation process involving separation of volatile chemical matter or mixture into its ingredient substances. More particularly, the invention relates to a method and apparatus for increasing fractionation capacity and efficiency across existing fractionation trays within an existing distillation column using microdispersers of various designs to increase vapor-liquid interaction across a tray and within the column.

2. Description of Related Art

Fractionation is a unit operation in chemical engineering principle and is employed for separation of a chemical mixture into individual components or compounds due to various chemical compounds having different boiling points under a given system pressure. Fractionation or distillation may be broadly defined as any method by which a vapor or liquid mixture is separated into individual components by vaporization or condensation.

Generally, during distillation, a volume of liquid flows across a vertical stacked series of horizontally mounted tray decks within a cylindrical vessel or distillation column from the top of the column to the bottom. Typically, vapor is introduced into the column through a feed in the lower portion of the column and rises up through small perforations spread over each tray deck. The contact between the vapor phase and the liquid phase of the distillate generates a layer of bubbles or froth. The froth allows the vapor to intimately contact the liquid wherein the vapor phase transfers less volatile matter to the liquid phase. Thus, as the vapor rises up through each tray, the vapor becomes more volatile while the less volatile matter in the liquid phase increases as it moves down on each tray. In turn, the vapor separates from the froth and rises while the liquid separates and is distributed to the tray below. This process occurs many times throughout the column as the vapor rises up and liquid flows down. The distillation trays provide the function of allowing intimate contact or mixing between the vapor and liquid. The trays also separate the vapor and the liquid, thereby allowing the vapor to rise and the liquid to flow in different directions, respectively. Product streams may be drawn at different levels within the column allowing for quick and efficient separation of volatile chemical matter.

In practice, the fractionation of hydrocarbon components within the distillation column occurs continuously across the trays with various streams of vapor and liquid into and out of the column. Revamps or de-bottlenecking of such column of trays are performed on such columns to increase the throughput or capacity of separation between the vapor and liquid phases or improving the fractionation efficiency. Several types of revamps include adding new separation zones such as adding a packed material, changing the distillation area by changing an inlet region such as a downcomer, and/or adding multiple downcomers within the column. In order to begin such revamp, the distillation column must be shut down and all hydrocarbon processing is stopped leading to loss of processing time and ultimately, loss of profits.

U.S. Pat. No. 4,604,247 issued to G. Chen et al. describes a revamp utilizing structure of a packed material and method. Folded structured packing is added to replace the trays within the column. However, typical packing is complex or bulky in either a structured or random form which requires removal some or all of the trays to optimally install the packed material. This increases the cost and time of installation.

Another type of distillation apparatus revamp is a multiple downcomer arrangement, which attempts to increase the effective active area of a tray deck. U.S. Pat. No. 5,547,617 issued to A. Lee, et al. describes a revamp structure, which replaces in part or in whole of the internal tray structure of the distillation column. The entire tray deck structures are removed such that new trays with multiple downcomers in a U-shaped pattern are installed in place of the original trays. Thus, a large amount of additional material is needed to construct and manufacture each new tray with the supporting downcomer and active bridge baffle.

U.S. Pat. No. 6,003,847 issued to A. Lee et al. illustrates a modified downcomer structure with an activated inlet portion. However, the typical construction and revamp discards the original internal structures within the distillation column. Totally new components are assembled within the column thereby increasing the waste material and time involved in the field installation.

In U.S. Pat. No. 6,095,504 issued to Heldwein et al., a modified support structure for revamping distillation column internals is disclosed. A single ring support at a lower bottom tray deck is configured to support upper tray decks in order to speed installation. Likewise, this apparatus does not reuse the internal structures thereby increasing waste material and manufacturing costs.

The details of revamping a distillation column are also disclosed in U.S. Pat. No. 6,113,079 to Urbanski. An adjustable circumference fractionation tray includes slideable decking plates, which aid in the installation of the new tray decks. However, additional bolting and new sliding tray deck structures must be manufactured and installed leading to increased down time and potential problems with the adjustable tray deck surfaces.

Accordingly, there is a need for a revamp method and apparatus which increases the capacity and efficiency of a distillation column with existing fractionation trays. It would be desirable that inactive areas of the tray deck are "activated" to provide an additional increase in the vapor-liquid interaction in the inactive area. The revamp and conversion apparatus should be easy and simple to manufacture and install while retaining enough durability for use in the vapor and liquid environment of hydrocarbon processing. The revamp apparatus should also be easy to install to substantially reduce the labor cost and provide time savings during critical installations. There is a need for a kit for performing the revamp during a regular maintenance cycle with minimal shutdown time while still increasing the efficiency across the existing fractionation trays.

BRIEF SUMMARY OF THE INVENTION

A method and apparatus for increase fractionation capacity and efficiency of chemical compounds within a preexisting distillation column is disclosed. The apparatus upgrades a preexisting distillation column with a vertically oriented vessel having at least one preexisting horizontally oriented fractionation tray deck mounted inside the vessel. The preexisting fractionation tray deck separates lighter vapor rising from below the tray deck and heavier liquid flowing across the top of the tray deck surface. The tray deck has a multiplicity of openings where the lighter vapor flows through to mix with the liquid to form froth. According to the present invention, a conversion microdisperser is configured to attach through one of the openings in the tray deck to disperse the vapor stream through the liquid flow to enhance the fractionation of volatile hydrocarbons and/or other chemicals in greater capacity and with greater efficiency.

The microdisperser may be a microdispersion valve or an individual bubble promoter. The microdispersion valve preferably is easy to install within the tray deck by means of a quick connect leg means or conventional legs and has a perforated deflection means which further helps to separate the vapor and liquid in a more efficient manner. The microdisperser bubble promoter is a box-like structure, which is configured to attach through an individual tray deck opening and may cover a portion of the adjacent tray deck. The microdisperser bubble promoter has perforations, slots or tabs to further separate and/or direct the vapor stream through the liquid flow. The microdisperser valves or bubble promoters may be round, square, rectangular or any other suitable vapor dispersing shape.

One embodiment of the present invention may be characterized as a microdisperser, which attaches through two or more openings in the tray deck. The microdisperser may be configured to be a continuous apparatus, which lies over the entire inlet portion in a one-piece structure. A downcomer panel may be situated above the inlet section in a segmented, conical or round shape, which would correspond to a respective continuous microdisperser shape.

Another embodiment of the present invention is a microdisperser bubble promoter that spans over an inactive area with two vapor openings in the tray deck separating the inactive area and providing the attachment area for the microdisperser. The inactive area may be over a major or minor tray support beam or the inactive area may be located at the edge of the distillation column vessel wall. The individual microdisperser will preferably direct vapor stream from the inactive zone through liquid flow such that fractionation capacity and efficiency is increased.

A method of using the apparatus for the subject fluid flow and enhancing interaction of fluids is provided. Conventional fractionation trays have inactive zones or areas and stagnant liquid back flow located at the inactive zones. The inactive areas may be located at an inlet portion under a downcomer, which is subject to a high rate of liquid flow. Microdisperser valves and/or bubble promoters may be placed at the inactive areas to promote vapor-liquid interaction over the existing fractionation tray. A specific microdisperser is selected and placed in the inactive area to preferentially direct the stream of vapor through the flow of liquid.

A kit for realizing the subject improvement of preexisting trays for fractionation columns is disclosed with instructions and a diagram for placing the microdispersers throughout the existing tray deck and hardware and tools for attaching the microdispersers to the tray deck.

In general, one advantage of the present invention is to provide an efficiency and capacity upgrade to an existing distillation column with preexisting trays.

Another advantage is reducing the cost and time of distillation column modernization during a routine maintenance while preserving the tray decks or panels of existing trays. Thus, process plant downtime is greatly reduced, thereby maximizing operating profits.

A further advantage of the present invention is to provide an economical way to convert the existing trays to highest performance possible without resorting to a full or partial replacement of the existing trays with new tower internal structures according to various embodiments of the prior art within the field of mass transfer art. Many parts may be recycled and reused thus saving time, resources, and the environment.

Yet another advantage of the present invention is to provide an apparatus of the above character, which reduces the cost of energy and material to fabricate the components for the practice of the present invention. Reduction of the present invention to practice will result in inexpensive, easy and quick modernization of the existing process plants with columns of fractionation trays to achieve substantial energy savings, improving product purity and increase in plant capacity.

The accompanying drawings, which are incorporated in, and form a part of this specification, illustrate embodiments of the invention and, together with the following description, serve to explain the principles of the invention.

BRIEF DESCRIPTION OF THE DRAWINGS

FIG. 1 is schematic cross sectional view of a conventional distillation column showing a downward flow of fluid with an upward rise of vapor across a series of conventional tray decks within the column.

FIG. 2 is an enlarged schematic view of two different flow openings within the conventional tray deck shown in FIG. 1.

FIG. 4 is an overhead plan view of the conventional tray deck of FIG. 3 showing round valves within the round valve openings.

FIG. 5A depicts target conversion areas of alternative rectangular valves of a conventional tray deck for improving fluid flow and distillation across the tray deck.

FIG. 8A is a close up cross sectional view of a microdisperser valve in a conventional tray deck opening.

FIG. 8B illustrates a close up cross sectional view of a microdisperser valve in a venturi tray deck opening.

FIG. 10A illustrates a perspective view of a conversion microdisperser valve with vapor optimizer perforations with quick connect leg supports.

FIG. 10B is an isometric view of a conversion microdisperser valve with directional vapor deflectors and quick connect leg supports.

FIG. 10C illustrates an isometric view of a conversion microdisperser valve with directional vapor deflectors and conventional leg supports.

FIG. 10D shows a perspective a prior art conventional valve with typical conventional leg supports.

FIG. 10E is a perspective view of a conversion microdisperser valve in a rectangular configuration with vapor optimizers and quick connect legs.

FIG. 11A illustrates a perspective view of a conversion microdisperser bubble promoter in a square configuration.

FIG. 11B illustrates an isometric view of a conversion microdisperser bubble promoter in a round configuration.

FIG. 11C shows a perspective view of a spanning microdisperser bubble promoter over a major support beam.

FIG. 12A illustrates an isometric view of a continuous spanning microdisperser bubble promoter at an inlet section of a conventional tray deck, which spans several vapor openings.

FIG. 12B is a perspective view of a spanning microdisperser bubble promoter over a major support beam.

FIG. 12C illustrates a perspective view of a spanning microdisperser bubble promoter configured to cover multiple vapor openings over a major support beam.

FIG. 12D illustrates a simple microdisperser bubble promoter covering two vapor openings.

FIG. 12E shows an isometric view of a short continuous microdisperser bubble promoter in an angled configuration over multiple vapor openings.

FIG. 12F shows a simple microdisperser bubble promoter covering multiple vapor openings.

FIG. 12G illustrates an isometric view of a directional microdisperser bubble promoter having a preferential vapor direction.

FIG. 16 is an overhead plan view of the desired, uniform flow over the revamped tray deck of FIG. 15.

FIG. 20A is a cross section view of an alternate embodiment of conversion with preexisting sieve trays configured with a microdisperser valve and a microdisperser bubble promoter.

FIG. 20B is a perspective view of one embodiment of conversion microdisperser bubble promoter with a bolting attachment means onto the existing tray decks.

DETAILED DESCRIPTION OF THE INVENTION

Figure 3:
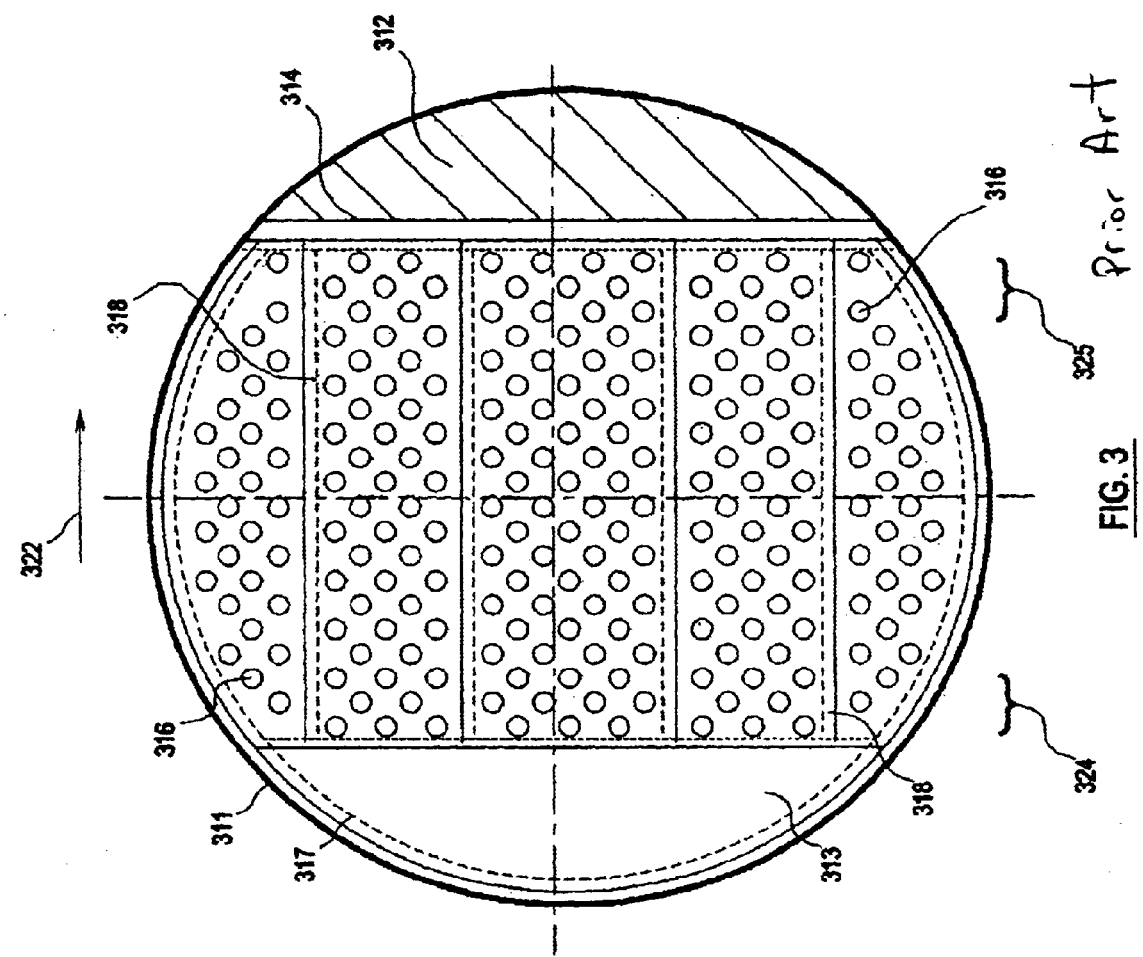
FIG. 3 is an overhead plan view of a conventional tray deck showing multiple round valve openings within the tray deck.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The descriptive language used both in the specification and claims is for the purposes of clarity and convenience and not with any purpose of implied limitation to fractionation, distillation, or mass transfer art, or to a vertical disposition of parts as is usually the case within a distillation column comprising horizontal fractionation tray decks.

The microdispersers according to the present invention are ideally utilized in a mass transfer environment, such as in a distillation column with fractionation tray decks for hydrocarbon processing. The microdispersers of the present invention allows for a better and more efficient separation or fractionation of vapors, gases, fluids and liquids into desired products. The processing may be to purify substances, remove water from a feed, or any other mass transfer-type process. The microdisperser of the present invention may be configured and manufactured to fit within existing mass transfer fractionation trays. The microdisperser is illustrated, described and claimed, generically and in preferred specific embodiments.

The term "fluid" is adopted from the terminology of mass transfer applications, in order to describe generally, without restriction to mass transfer technology, the kind of particulates that would flow from a top portion of the distillation column across the fractionation tray decks and microdispersers of the present invention. The particulates in fractionation operations generally consist of droplets, bubbles, or froth at the molecular level or on a microscopic scale. Typically, "vapor" or "gas" is a lighter substance and "liquid" is a heavier substance.

The terms "tray" and "tray deck" refer to the surface structure within a fractionation column used in mass transfer applications. The tray is also described as a fluid contacting fractionation tray. In a typical tray installation, the upper surface of the tray is toward the top of the tower and the lower surface of the tray is toward the bottom of the tower. Many different trays may be contained within a distillation column and typically number from 10 to over 100 trays. Several tray openings are positioned throughout the tray deck surface. Ordinarily, valves or other devices are positioned on or near the tray openings to regulate a stream of vapors through the liquid flow. However, the term tray herein means simply any surface structure through which a microdisperser, such as in the present invention, is attached to.

The microdisperser unit of the present invention is preferably inserted into the openings of the trays for use in a fractionation column and vapor-liquid environment. However, it is not intended to restrict the application of the invention to a hydrocarbon processing distillation column with trays or for use in only a fluid environment or a fractionation column. Other distillation applications for microdisperser implementation include columns and tray decks with a maldistributed liquid flow across the surface and/or a non-uniform vapor stream from beneath the tray deck.

The terms "flooding" and "weeping" refer to conditions on the fractionation tray during operation. Flooding is where ascending vapor from below the fractionation tray shoots through any opening in the tray deck in a vertical and upwardly direction to pass relatively undisturbed through the liquid to hit the tray deck above. Typically, flooding occurs under high vapor flow rate conditions allowing for the vapor to shoot through the liquid. Weeping occurs under a low vapor flow rate condition whereby the liquid seeps through the perforations in the tray surface down to the tray below. Under higher liquid flow rates, "dumping" may occur where the liquid flows through the valve perforations instead of across the tray deck and through the downcomer.

Throughout the specification and claims, reference is made to "movable" as generally describing the movement of the tray valve when inserted into the tray deck and opening. In general, the dispersion tray valve preferably moves in an upward and downward motion relative to the tray deck. This movement allows for the fluid to pass from one side of the tray deck to the other side to accomplish the fractionation of fluids required by mass transfer technology. The distance between the tray deck and the dispersion valve defines a valve unit skirt opening where lighter fluid particles pass through.

Turning now to the drawings, wherein like components are designated by like reference numerals throughout the various figures, attention is directed to FIG. 1. A schematic cross sectional view of a conventional distillation column is shown having a downward flow of fluid across an existing conventional fractionation tray deck with an upward rise or stream of vapor through vapor openings in the tray deck within the column. The distillation column in FIG. 1 has substantially vertical sides defining a vessel 111. Tray support ring 117 attached to a side wall of vessel 111 and provides a foundation for support beam 118. An inlet section 113 of existing tray deck is located above support beam 118 and below downcomer 112 from tray deck positioned above the respective tray deck. Downcomer 112 helps to define inlet section 113 in that the downcomer may have a straight, round or segmented shape and the portion directly beneath the downcomer is an inlet portion 113 where liquid flowing from above flows into the inlet section 113 and may cause flooding due to the high rate of liquid flow and pressure. Tray deck 115 has a multiplicity of vapor openings 116 for the passage of vapor 123 from below the deck. Weir outlet 114 defines an end of portion of tray deck 115 and provides an outlet portion to downcomer 112 to the tray deck below. Liquid flow 120 passes from the downcomer 112 of a tray above into inlet section 113. The liquid flow passes over valves 160 within openings 116. Froth gradient 128 of fluid is defined as the difference of higher fluid level 126 at inlet portion 113 over that at outlet fluid level 127 at weir outlet 114. The great differential in the froth gradient causes high or large outlet vapor flow 182 and low or small inlet vapor flow 181.

FIG. 2A is an enlarged schematic view of one typical flow openings within the conventional tray deck shown in FIG. 1. Conventional tray deck 215A has valve 260 in opening 216A. FIG. 2B is an alternative flow opening with a venturi type opening 216B created by extrusion or pressing of the tray deck. Valve 260 is inserted into venturi opening 216B of tray deck 215B. The venturi type openings 216B promotes streamline flow of vapor between tray decks in a directional manner. The pressure drop is minimized as the vapor flows through the directional opening. However, the extruded orifice does not completely eliminate any bottleneck problems.

FIG. 3 is an overhead plan view of a conventional preexisting tray deck showing multiple round vapor openings within the tray deck. Column vessel wall 311 forms a cylindrical vessel and supports tray support ring 317. The tray support ring 317 attaches by conventional means to the vessel wall 311 and a periphery of a fractionation tray deck 315. The fractionation tray deck 315 has vapor openings 316 and is suspended by support beam 318 within the vessel. Liquid flow 322 is from an upstream portion of the tray deck column to a downstream portion of the tray deck to define an inlet area 324 and an outlet area 325. The downcomer from an upper tray (not shown) defines an inlet portion 313 of the tray deck 315 where a high rate of liquid flow floods this portion of the tray deck. Weir outlet 314 directs the liquid flow 322 into a downcomer 312 to the fractionation tray deck below.

Figure 3A:
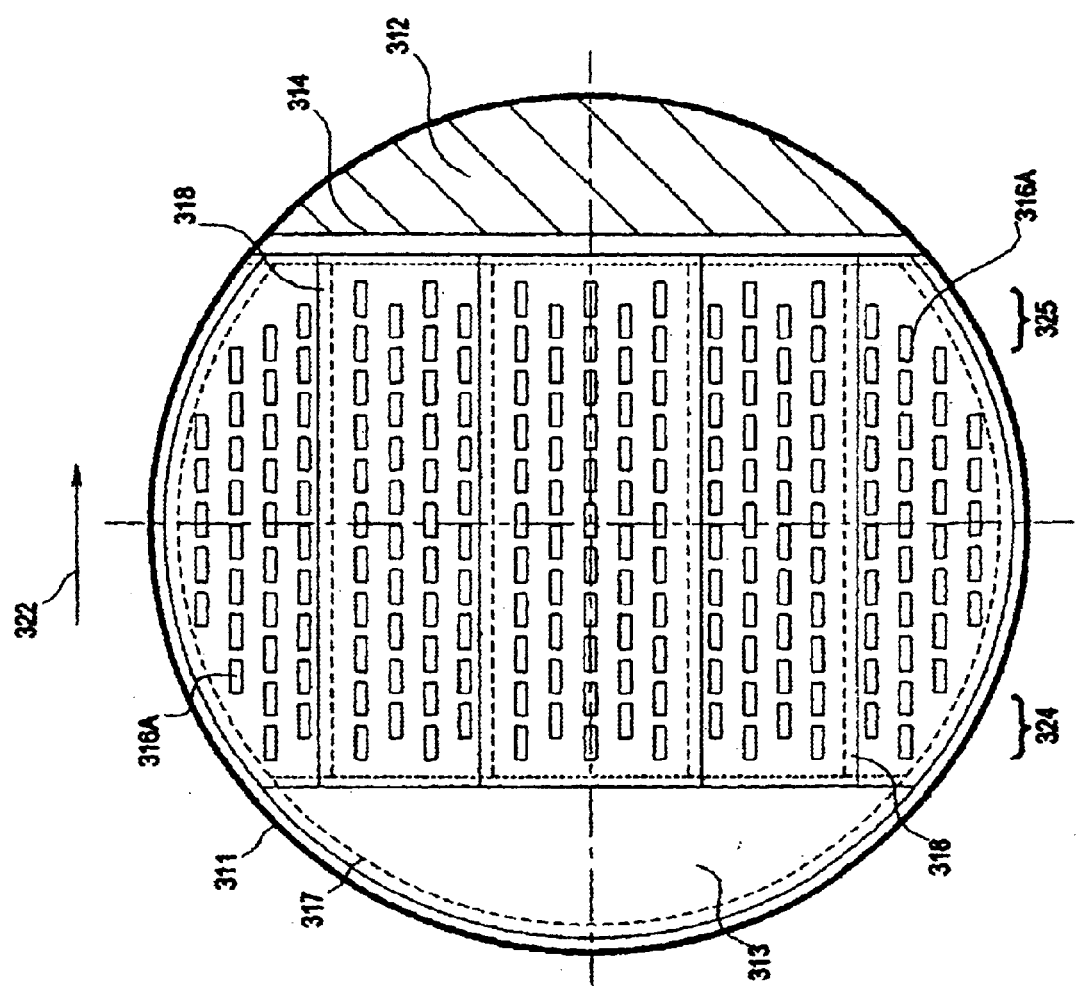
FIG. 3A is an overhead view of a conventional tray deck showing multiple rectangular valve openings within the tray deck.

FIG. 3A is an overhead view of an alternative conventional tray deck. The preexisting fractionation tray has multiple rectangular valve openings 316A within tray deck 315. Column vessel 311 encloses the distillation tray deck 315. Tray support ring 317 is fixed to vessel wall 311, which supports inlet area 313. Downcomer 312 from an upper tray allows the liquid to flow down to the inlet area 313. Support beam 318 supports tray deck 315 and may be attached to support ring 317 to support the tray deck 315 within vessel 311. Liquid flows 322 across tray deck 315 over vapor opening 316A wherein a vapor stream from below the tray deck passes to mix with the liquid flow above the tray deck. The rectangular vapor openings 316A provide for an alternative vapor opening where specialized plates or valves may be mounted. Target inlet area 324 is marked to show an area of tray deck 315, which is subject to a high liquid gradient and pressure. Outlet area 325 is marked to show an area of tray deck 315 which is subject to a high vapor gradient where little vapor-liquid mixing occurs causing uneven flow across the tray deck.

FIG. 4 is an overhead view of the conventional tray deck of FIG. 3 showing round valves within the round valve openings. As in FIG. 3, column vessel wall 411 forms a cylindrical vessel and supports tray support ring 417. The tray support ring 417 attaches by conventional means to the vessel wall 411 and supports a periphery of a fractionation tray deck 415. The fractionation tray deck 415 has vapor openings 416 and is suspended by support beams 418 within the vessel 411. The support beams 418 may also be suspended by tray support ring 417. Liquid flow 422 is from an upstream portion of the tray deck column to a downstream portion of the tray deck to define an inlet area 424 and an outlet area 425. The downcomer from an upper tray (not shown) defines an inlet portion 413 of the tray deck 415 where a high rate of liquid flow floods this portion of the tray deck causing a high liquid gradient. Higher vapor stream pressure at outlet area causes a maldistributed liquid flow where little fractionation or mass transfer occurs. Weir outlet 414 directs the liquid flow 422 into a downcomer 412 to the fractionation tray deck below. Preexisting conventional valves 460 are depicted as solid rings over the entire tray deck 415. The valves 460 are installed into openings 416 shown as dotted lines. As illustrated, the installation of the valves 460 creates multiple dead or inactive zones over the inlet areas 424 and outlet areas 425, near the tray support ring 417, and the tray support beams 418 due to the size of the valves. This helps to contribute to the fluid flow problems within existing fractionation towers.

Figure 5:
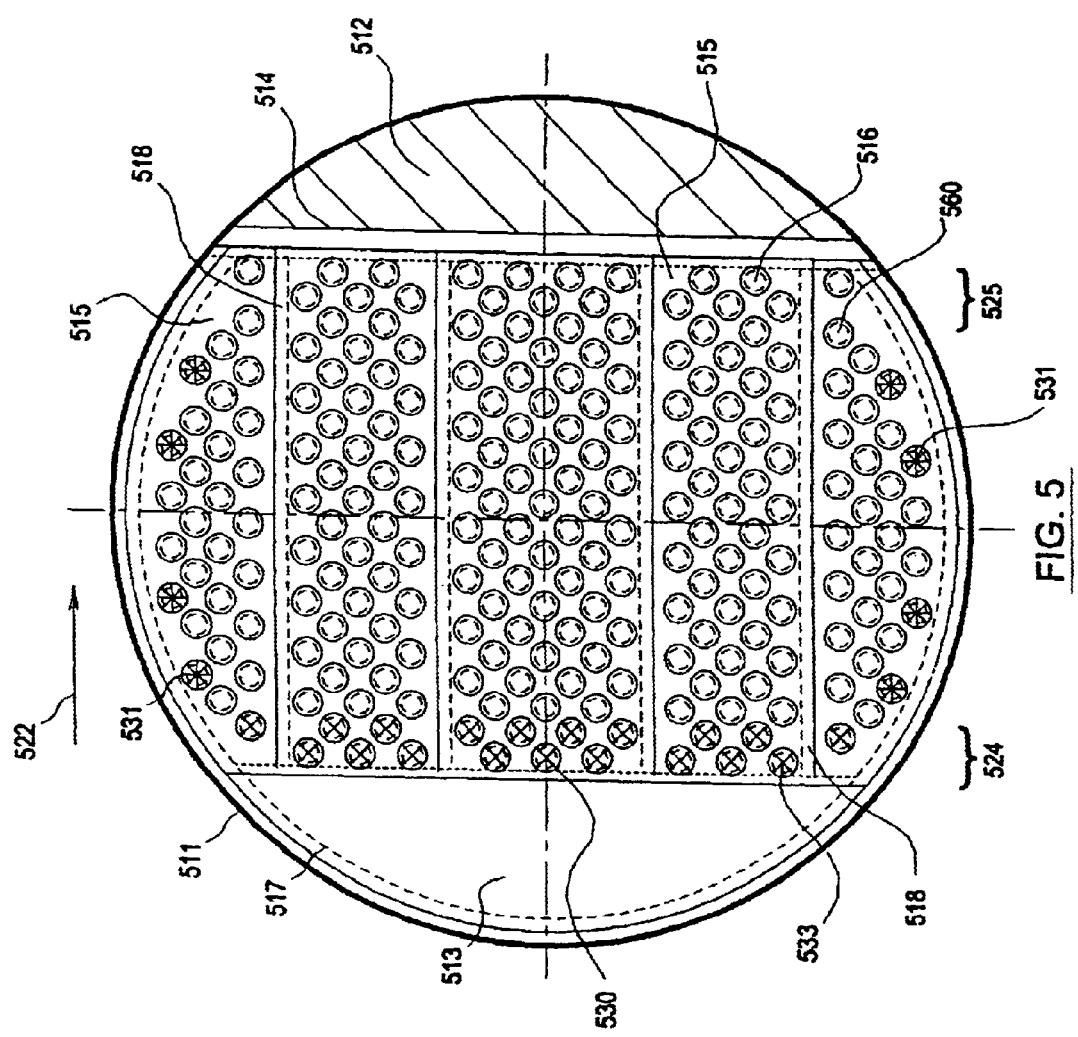
FIG. 5 illustrates target conversion areas of conventional round valves of FIG. 4 for improved flow across an existing conventional tray deck.

Turning to FIGS. 5A–B, target conversion areas of a distillation column fractionation tray for microdispersers of the present invention are pointed out. FIG. 5 illustrates target conversion areas of a round valve embodiment of the present invention for improved flow across the tray deck. The distillation column has a vessel 511 where a tray support ring 517 is attached. A downcomer section from an upper tray defines inlet section 513 as a substantially planar surface of tray deck 515. Tray deck 515 may be supported by tray support beams 518 which can be attached to tray support ring 517 at a periphery of the vessel 511 near a side wall. Tray deck 515 has vapor perforations or openings 516 with conventional round floating valves 560 installed throughout the tray deck. A weir outlet 514 is positioned at an outlet section of tray deck 515 to lead liquid flow 522 into a downcomer 512 of the fractionation tray below. An upstream portion of tray deck 515 is targeted as inlet area 524 while a downstream portion of tray deck 515 is targeted as outlet area 525. Inlet target conversion microdispersers 530 assist in directing the liquid flow as it enters the subject fractionation tray. Target tray support ring conversion microdispersers 531 are installed along a periphery of the tray deck 515 near a side wall of vessel 511. This placement allows for directing a preferential flow of liquid and vapor away from the side wall of vessel 511 thereby preventing any maldistributions or stagnant flow. A target support beam microdisperser 533 is located at or near a tray support beam 518. The microdisperser 533 is a spanning bubble promoter configuration which may span over the tray support beam 518 thereby eliminating an inactive area of the existing fractionation tray deck.

FIG. 5A illustrates target conversion areas of rectangular valves of the present invention for improving fluid flow and distillation across the tray deck in a similar manner of the distillation column of FIG. 5. The distillation column has a vessel 511 where a tray support ring 517 is attached. A downcomer section from an upper tray defines inlet section 513 as a substantially planar surface of tray deck 515. Tray deck 515 may be supported by tray support beams 518 which can be attached to tray support ring 517 at a periphery of the vessel 511 near a side wall. Tray deck 515 has vapor perforations or openings 516A with conventional rectangular floating valves 560A installed throughout the tray deck 515. A weir outlet 514 is positioned at an outlet section of tray deck 515 to lead liquid flow 522 into a downcomer 512 of the fractionation tray below. An upstream portion of tray deck 515 is targeted as inlet area 524 while a downstream portion of tray deck 515 is targeted as outlet area 525. Inlet target conversion microdispersers 530A assist in directing the liquid flow as it enters the subject fractionation tray. Target tray support ring conversion microdispersers 531A are installed along a periphery of the tray deck 515 near a side wall of vessel 511. This placement allows for directing a preferential flow of liquid and vapor away from the side wall of vessel 511 thereby preventing any maldistributions or stagnant flow across the fractionation tray. A target support beam microdisperser 533A is located at or near a tray support beam 518. The microdisperser 533A is a spanning bubble promoter configuration which may span over the tray support beam 518 thereby eliminating an inactive area of the existing fractionation tray deck.

Figure 6:
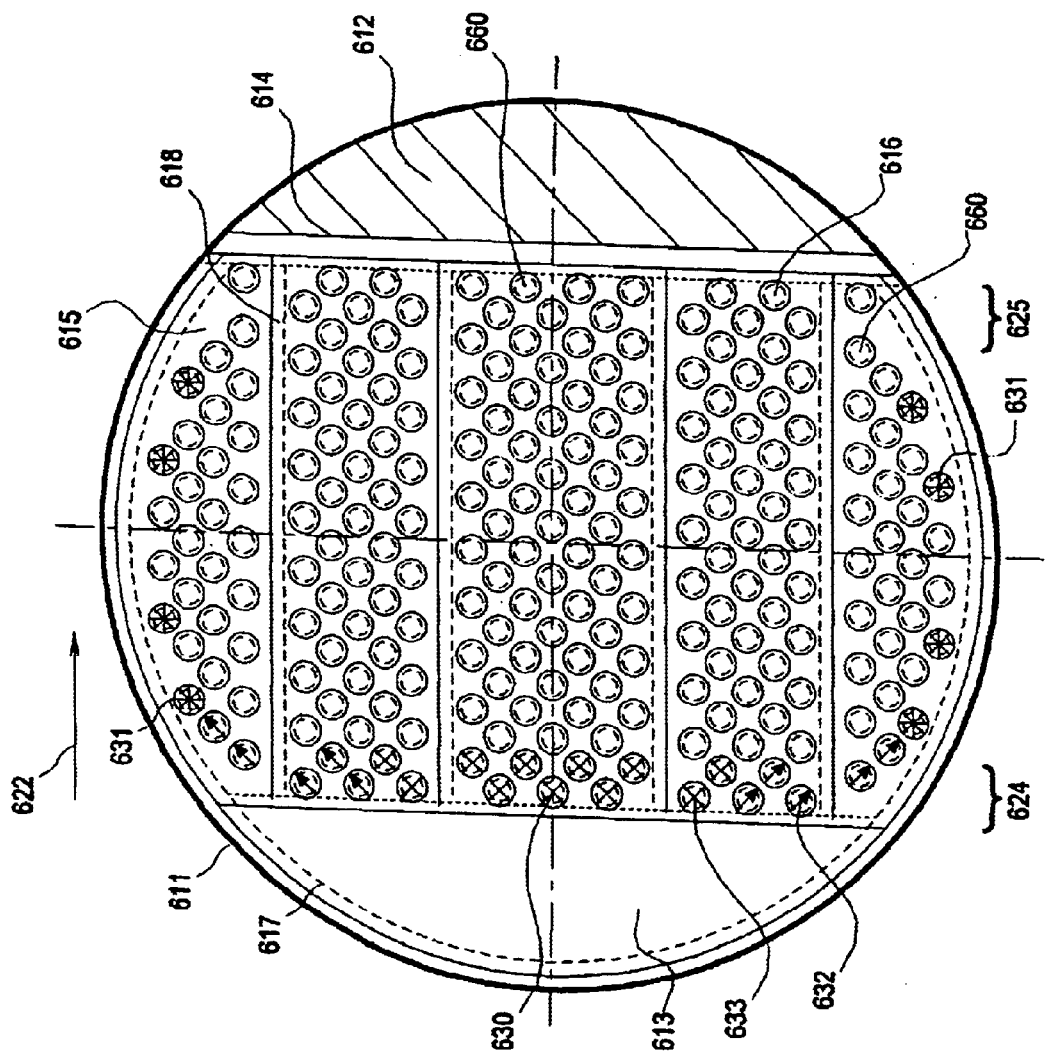
FIG. 6 demonstrates target initial thrust conversion areas at an inlet area of a conventional tray deck.

FIG. 6 illustrates target initial thrust conversion and directional microdisperser valves and/or bubble promoter areas at an inlet area of a conventional tray deck. The distillation column has a vessel 611 where a tray support ring 617 is attached. A downcomer section from an upper tray defines inlet section 613 as a substantially planar surface of tray deck 615. Tray deck 615 may be supported by tray support beams 618 which can be attached to tray support ring 617 along a side wall of vessel 611. Tray deck 615 has vapor perforations or openings 616 with conventional round floating valves 660 installed throughout the tray deck. A weir outlet 614 is positioned at an outlet section of tray deck 615 to lead liquid flow 622 into a downcomer 612 to the fractionation tray below. An upstream portion of tray deck 615 is targeted as inlet area 624 while a downstream portion of tray deck 615 is targeted as outlet area 625. Inlet target conversion microdispersers 630 assist in directing the liquid flow as it enters the subject fractionation tray. Target tray support ring conversion microdispersers 631 are installed along a periphery of the tray deck 615 near a side wall of vessel 611. A target support beam microdisperser 633 is located at or near a tray support beam 618. The microdisperser 633 is a spanning bubble promoter configuration which may span over the tray support beam 618 thereby eliminating an inactive area of the existing fractionation tray deck. Additionally, thrust directional microdispersers 632 direct the liquid flow in a preferential direction around the fractionation tray deck with a preferential thrust. This may be accomplished by having a microdisperser with deflecting perforations or tabs along with a fixed orientation during installation. The thrust directional microdispersers 632 force the liquid past any possible stagnant liquid flows to have a uniform flow 622 across the tray deck allowing for a higher capacity and efficiency of distillation.

Figure 7A:
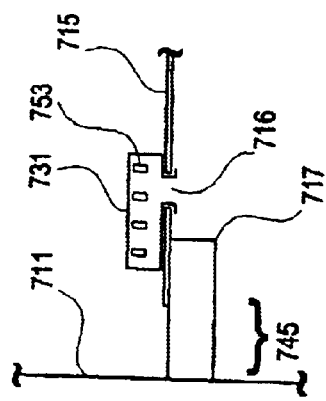
FIG. 7A shows a side view of a conversion microdisperser bubble promoter at an edge of a tray deck near a column wall and tray support.

Turning to FIGS. 7A–E, various cross sectional view of microdisperser bubble promoters are shown. In FIG. 7A, a conversion microdisperser promoter at an edge of a tray deck near a column wall and tray support. An existing distillation column has a pre-existing vessel 711 with an attached tray support ring 717. Tray deck 715 is supported by support ring 717. A vapor opening 716 is located in tray deck 715 near tray support ring 717. The conversion microdisperser bubble promoter 731 according the present invention preferably has an attachment means to attach through the vapor opening 716 such that vapor streaming through the vapor opening passes through the bubble promoter 731 and through perforations 753 in the bubble promoter. The bubble promoter 731 spans over a portion of an inactive region 745 created by the vessel wall 711, tray support ring 717 and tray deck 715. Without the conversion bubble promoter 731, a potential stagnant flow may form in the inactive region 745. The perforations 753 help to direct vapor through conversion bubble promoter 731 to pass vapors over the inactive area thus increasing the capacity and efficiency of distillation. One skilled in the art will appreciate that the conversion bubble promoter may be installed in any area where there is an inactive zone where the promoter is installed within an existing opening of the tray deck and covers a portion of the adjacent tray deck to distribute and disperse the vapor stream.

Figure 7C:
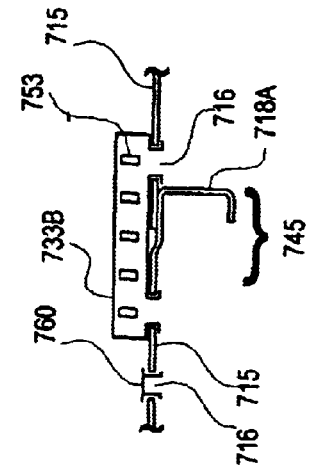
FIG. 7C shows a side view of a spanning microdisperser bubble promoter over a minor support beam attached to two different flow openings.
Figure 7B:
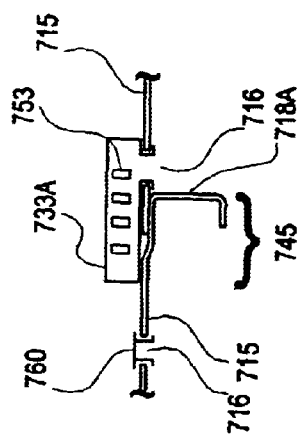
FIG. 7B is a side view of a conversion microdisperser bubble promoter over a minor support beam.

FIG. 7B shows an alternate embodiment of a spanning microdisperser bubble promoter over a minor support beam. Dead zone or inactive region 745 is created by the over lap of one tray deck 715 and another adjacent tray deck. Both tray decks are supported by minor support beam 718A. Very little to no fractionation occurs over the minor support beam 718A and inactive region 745. By placing conversion bubble promoter 733A within a vapor opening 716 in the tray deck 715, vapor is directed over the inactive area 745 through perforations 753 in bubble promoter 733A. A conventional valve 760 is located in an adjacent vapor opening 716. Thus, a previously inactive area which contributes to a reflux and maldistributed flow is activated on the existing tray deck.

FIG. 7C shows an alternate embodiment of the spanning microdisperser bubble promoter of FIG. 7B. Spanning microdisperser 733B is preferably installed over a minor support beam 718A to attach to two different flow openings 716 in adjacent tray decks 715. This "activates" the inactive region 745 such that vapor can stream from beneath the tray deck and support beam to pass through perforations 753 in spanning bubble promoter 733B to interact with the liquid flow. The spanning microdispersing bubble promoter also provides for any slidable movement between the adjacent tray decks. Accordingly, fractionation may take place where it could not previously on the existing tray decks.

Figure 7E:
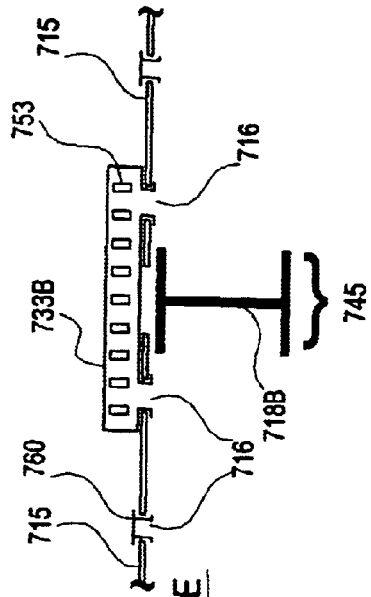
FIG. 7E is a side view of a spanning microdisperser bubble promoter over a major support beam and corresponding dead area.
Figure 7D:
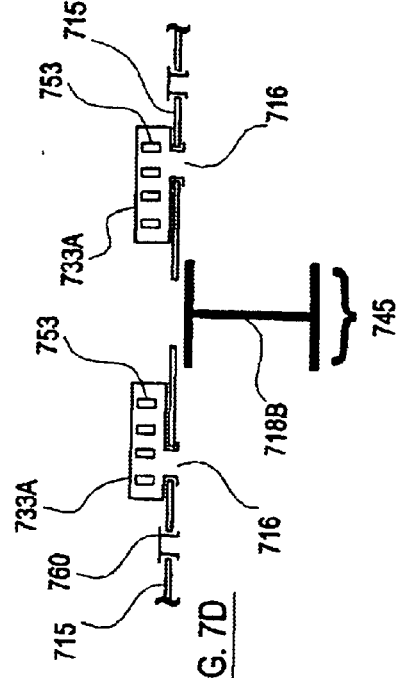
FIG. 7D illustrates a side view of two conversion microdisperser bubble promoters near a major support beam.

FIG. 7D illustrates a conversion microdisperser bubble promoter of FIG. 7B near a major support beam. Major support beam 718B support two adjacent tray decks 715. Spanning microdispersers 733A are installed within vapor openings 716 of tray deck 715. Preferably, microdispersers 733A cover a portion of the inactive area 745 over tray support beam 718B. A conventional floating valve 760 is located within vapor opening 760 adjacent to the microdispersers. The spanning microdisperser has perforations 753 which direct the stream of vapor over the former inactive area 745 of existing fractionation tray deck to intermix with the liquid flow above the tray.

FIG. 7E shows an alternate embodiment of the spanning microdisperser bubble promoter of FIG. 7C. Spanning microdisperser 733B is preferably installed over a major support beam 718B to attach to two different flow openings 716 in adjacent tray decks 715. This "activates" the inactive region 745 such that vapor can stream from beneath the tray deck and support beam to pass through perforations 753 in spanning bubble promoter 733B to interact with the liquid flow. The spanning microdispersing bubble promoter also provides for any slidable movement between the adjacent tray decks. Accordingly, fractionation may take place where it could not previously on the existing tray decks.

Referring to FIGS. 8A–B, two different tray deck openings are shown. FIG. 8A is a close up cross sectional view of a microdisperser valve in an existing conventional tray deck opening. Conventional tray deck 815A conventional deck has a conventional vapor opening 816A which is a simple opening. Microdisperser valve 835 is installed within vapor opening 816A and has a top cover with deflecting perforations 863. The deflecting perforations provide an optimized performance of vapor dispersion as the vapor flows from beneath tray deck 815A to interact with a liquid flow above the tray deck. The microdisperser valve 835 has standard attachment legs 855 to provide a "floating" function wherein the vapor pressure from below the tray deck will push the microdisperser valve 835 in an upward motion to facilitate fractionation and mass transfer between the vapor and liquid.

FIG. 8B is a close up cross sectional view of a microdisperser valve in a venturi tray deck opening. Existing venturi tray deck 815B has a venturi-style vapor opening 816B which is a pressed or extruded orifice. Microdisperser valve 835 is installed within vapor opening 816B and has a top cover with deflecting perforations 863. The deflecting perforations provide an optimized performance of vapor dispersion as the vapor flows from beneath tray deck 815A to interact with a liquid flow above the tray deck. The microdisperser valve 835 has venturi attachment legs 856 to provide a locked function wherein microdisperser valve 835 is "locked" into place. One skilled in the art will appreciate that either floating or locked valves of FIGS. 8A–B may be interchanged such that the either valve system in either opening is locked or floating. The venturi type openings 816B promote a streamline flow of vapor between tray decks in a directional manner. The pressure drop is minimized as the vapor flows through the directional opening. However, the extruded orifice does not completely eliminate any bottleneck problems.

Figure 9B:
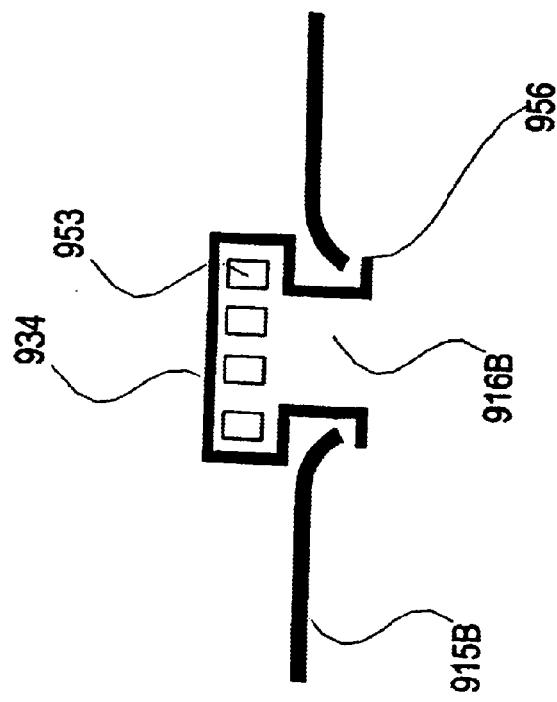
FIG. 9B is a close up cross sectional view of a conversion microdisperser bubble promoter within a venturi tray deck opening.
Figure 9A:
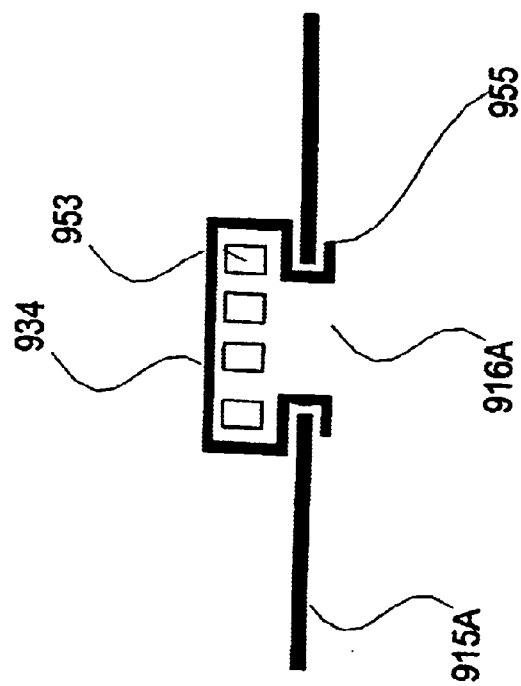
FIG. 9A shows a close up cross sectional view of a conversion microdisperser bubble promoter within a conventional tray deck opening

FIG. 9A depicts a close up cross sectional view of a conversion microdisperser promoter installed within an existing conventional tray deck opening. Existing tray deck 915A has a conventional vapor opening 916A which is a simple opening. Microdisperser bubble promoter 934 is installed within vapor opening 916A and has a top cover with perforations 953. The perforations 953 provide an optimized window for the streaming of vapor from beneath the tray deck 915A to interact with a liquid flow above the tray deck. The individual microdisperser bubble promoter 934 has standard attachment legs 955 to lock the bubble promoter to the tray deck surface.

FIG. 9B shows a close up cross sectional view of a conversion microdisperser promoter installed within a venturi tray deck opening. Existing venturi tray deck 915B has a venturi-style vapor opening 916B which is a pressed or extruded orifice. Microdisperser bubble promoter 934 is installed within vapor opening 916B and perforations 953 which provide a streaming flow path for the vapor passing from beneath the tray deck 915B. The individual microdisperser bubble promoter 934 has venturi attachment legs 956 which are required to be longer to accommodate the venturi opening 916B and maintain the venturi effect. The venturi type openings 916B promote a streamline flow of vapor between tray decks in a directional manner. The pressure drop is minimized as the vapor flows through the directional opening. However, the extruded orifice does not completely eliminate any bottleneck problems across the tray deck.

Turning to FIGS. 10A–E, various microdisperser valves according to the present invention are disclosed. FIG. 10A illustrates an embodiment of the present invention where the microdisperser is a valve-type unit. Conversion microdispersion valve has a main body top covering 1035 which is essentially parallel to the plane of a fractionation tray deck. Support leg 1065 has a upwardly oriented tab which will flex inwardly when a pushing force is exerted on the microdispersion valve such as when the valve is being inserted into an opening in the tray deck which is slightly smaller than the circumference formed by the support legs. In this embodiment, the top covering of microdispersion valve 1035 has dispersers or deflectors 1063 which provide a further dispersive effect of the vapor stream in a similar manner as disclosed in U.S. Pat. No. 6,145,816 to Chuang, et al., the specification of which is incorporated herein by reference. As the vapor flows up through the tray deck opening, the vapor is microdispersed to efficiently mix with the liquid flowing above the deck. Alternatively, the deflectors 1063 may be simple holes or perforations within the main body top covering to provide a further dispersative effect. This valve provides for a greater capacity within the distillation column from the preexisting opening as the valve can be installed while the original tray deck remains inside the existing distillation vessel.

In FIG. 10B, an alternative embodiment of the microdispersion valve of FIG. 10A is illustrated. The directing microdispersion valve has a main body top covering 1035 which is sized and shaped to fit existing tray deck vapor openings. The support legs 1065 are similar to the microdispersion valve in FIG. 10A providing a quick installation mechanism to install the valves within a tower. Vapor directional deflectors 1064 force the vapor to stream in the direction of the orientation of the deflector. This embodiment provides an efficient method and apparatus for directing the vapor stream away from inactive areas or dead zones caused maldistributed and stagnant liquid flow.

FIG. 10C is an alternative embodiment of the present invention where the conversion microdisperser of FIG. 10A is configured with standard support legs 1066. The microdispersion valve 1035 has vapor deflectors 1063 as the valve above. In a version of a conversion kit for more traditional replacement revamp parts, the standard support legs 1066 allow a designer or installer exactly replace the existing valves with like, higher capacity and efficiency microdispersion valves without any readjustment to the vapor opening in the tray deck with little change in cost. Additionally, one skilled in the art will appreciate that a locking ring (not shown) may be used with this configuration of the microdisperser to fully secure the valve within a vapor opening of a fractionation tray.

FIG. 10D illustrates a prior art conventional valve with typical attachment legs. The typical size of conventional valve 1060 is 48 mm in diameter but may range from 25 to 50 mm in diameter. Conventional valve has straight support legs 1066 which is installed into the tray deck opening and is separately attached by bending the tabbed portion of straight support leg 1066. Typically, valve 1060 is round, square or rectangular and can be regular or smaller to cover a tray deck opening. The microdisperser of the present invention may be sized and shaped to substantially cover a similarly sized and shaped conventional valve to increase the fractionation capacity and efficiency while reusing the existing tray deck.

An alternate conversion microdispersion valve according to the present invention is shown in FIG. 10E having a rectangular configuration with vapor optimizers and quick connect legs. Rectangular microdisperser valve 1035A has a substantially rectangular top covering surface, though one skilled in the art will appreciate that square valves or other irregular shape valves may be replaced. Vapor deflectors 1063 function in a similar manner to the vapor deflectors of FIGS. 10A and 10C. A square quick connect support leg 1067 allows the installer to utilize a quick "press-in" installation motion and procedure allowing for a quick and easy installation.

Alternative embodiments of the microdisperser bubble promoter of the present invention are illustrated in FIGS. 11A–C. In FIG. 11A, an individual conversion microdisperser bubble promoter is depicted in a square configuration. Individual promoter 1134A is square-shaped to fit within an individual vapor opening 1116 within tray deck 1115. Individual promoter 1134 is shown with perforations 1154 on top and 1153 on sides but may have at least one solid side with no perforations. The perforations 1154 and 1153 promote the interaction between the vapor and liquid at key target portions on the tray deck. The lack of perforations on any surface allows an directional installation for a preferential vapor streaming.

FIG. 11B illustrates a round configuration of the individual microdisperser bubble promoter of FIG. 11A. Individual promoter 1134B is round shaped and is sized to fit within vapor opening 1116 to cover the vapor opening within tray deck 1115. The round individual promoter 1134B provides for a universal directional vapor stream such that a previously less active valve due to a maldistributed or stagnant liquid flow may be activated to promote vapor-liquid interaction, thus increasing the fractionation column capacity and efficiency.

FIG. 11C shows a perspective view of a spanning microdisperser promoter over a major support beam. Spanning promoter 1133 covers typical dead or inactive area 1145 created by the lack of a vapor opening 1116 at or near a section of adjacent tray decks 1115 over major support beam 1118. The spanning promoter 1133 is installed with the vapor opening 1116 of tray deck 1115 and also covers a portion the inactive area 1145 of the tray deck 1115. Thus, the area at or near the tray support beam 1118 can be activated such that vapor flows across the previously inactive area 1145 of the existing tray deck to aid in a uniform distribution of vapor streams and liquid flow across the existing tray deck.

Turning now to FIGS. 12A–G, various configurations of a multiple vapor opening microdispersing bubble promoter are depicted. FIG. 12A illustrates a perspective view of one embodiment of the present invention where a continuous spanning microdisperser bubble promoter is installed along an inlet section of a conventional existing tray deck which spans several vapor openings. In one type of preexisting distillation column, a tray inlet section 1213 is a solid portion of tray deck 1215 without vapor openings due to a high rate of liquid flow from the downcomer above (not shown). The downcomer above may be straight, irregular, cone-shaped or segmented. Thus, the inlet portion 1213 is irregular with an irregular arrangement of vapor openings 1216 within tray deck 1215. Continuous conversion bubble promoter 1236 spans a continuous segment of vapor openings 1216 at the inlet section 1213 of the tray deck 1215 under or near the downcomer (not shown). One skilled in the art will appreciate that continuous bubble promoter 1236 will be attached and secured through several openings 1216. Preferably, continuous bubble promoter 1236 follows the shape of the downcomer such that liquid flow from the inlet section flows over the promoter to interact with the vapor stream from beneath the tray deck 1215. Continuous bubble promoter 1236 may have a solid non-perforated portion 1255 to prevent weeping straight down to the tray deck below. This embodiment provides for a conversion of the inlet port of the fraction tray such that the vapor gradient is equalized over the entire existing tray deck thereby eliminating maldistributed liquid and stagnant flow.

FIG. 12B illustrates a perspective view of an embodiment of the present invention showing a spanning microdisperser bubble promoter over a major support beam. In a typical distillation column, the major support beam is an attachment area where two flat sections of a fractionation tray are attached and supported within the vessel. This tray attachment area creates an inactive zone 1245 by a combination of the lack of vapor openings at or near the support beam 1218, mounting hardware to attach the tray decks together and to the beam and the tray deck spacing. A spanning bubble promoter 1233 according to the present invention covers the inactive zone 1245. Spanning bubble promoter 1233 is inserted into a vapor opening 1216 on tray deck 1215 on both sides of support beam 1218 to provide a vapor stream conduit from vapor openings 1216 over this previously unused space. This greatly increases the fractionation process by fully utilizing and activating any areas of the preexisting tray deck.

Additionally, in FIG. 12C, a spanning microdisperser bubble promoter 1238 covers a larger portion of an inactive area 1245 over support beam 1218. The spanning microdisperser bubble promoter 1238 is installed into two or more vapor openings 1216 in tray deck 1215 on both sides of the support beam 1218. The promoter 1238 may be configured to have perforations on the tops and sides or even deflectors to direct the vapor stream over the previously inactive area of the preexisting tray deck. This embodiment is also useful in areas of flex where adjacent tray decks 1215 may buckle or slide against one another during the fractionation process. By spanning a parallel and perpendicular plane of the inactive area 1245 over the tray support beam 1218, the spanning bubble promoter is more secure and locked into position to increase the fractionation capacity and efficiency. This is another option for the conversion microdisperser that reduces costs of the overall revamp.

FIG. 12D illustrates a simple microdisperser promoter covering two vapor openings. Individual microdisperser bubble promoter 1237A is simple box-like unit covering two vapor openings 1216 of tray deck 1215. This can be placed directionally in an orientation such that vapor flows over a specific area or away from an inactive zone of the fractionation tray.

An alternative embodiment of the present invention is depicted in FIG. 12E where a short bubble promoter in an angled configuration over multiple vapor openings. Individual continuous microdisperser bubble promoter 1237C is shown installed over three vapor openings 1216 of tray deck 1215. This is angled such that a specific downcomer configuration or specific flow pattern can be configured to address known maldistributed vapor streams or stagnant liquid flows across the preexisting fractionation tray deck. The irregular configuration also allows for the enhancement of non-uniform vapor openings within preexisting tray decks. This allows for a more economical revamp and upgrade process such that small directional sections of conversion promoters may be utilized and installed during a regular, short maintenance window.

FIG. 12F shows a simple microdisperser promoter covering multiple vapor openings. Individual microdisperser bubble promoter 1237C is configured to install over three vapor openings 1216 of tray deck 1215. Individual promoter 1237C may be used to cover known inactive areas across the preexisting tray deck 1215. The individual promoter 1237C may also be configured to direct flow with at least one solid, non-perforated side to the upstream liquid flow where the liquid will pass over the bubble promoter to preferentially interactive with the vapor flow.

FIG. 12G illustrates an alternate embodiment of a microdisperser according to the present invention. Directional microdisperser bubble promoter 1239 covers three vapor openings 1216 in tray deck 1215. A side wall 1255 of the directional bubble promoter 1239 does not have any microperforations, preferably along the upstream flow direction. Downstream portions may be angled as shown to direct the vapor stream in a more efficient flow thereby break up any maldistributions. Directional bubble promoter 1239 can be placed to directionally direct the flow of vapors from edges or undesired inactive zones and specifically improve flow across the tray deck 1215 surface. The directional bubble promoter may also be used over an irregular vapor opening spacing in the tray deck such that flow is directed in a desired pattern.

Figure 13:
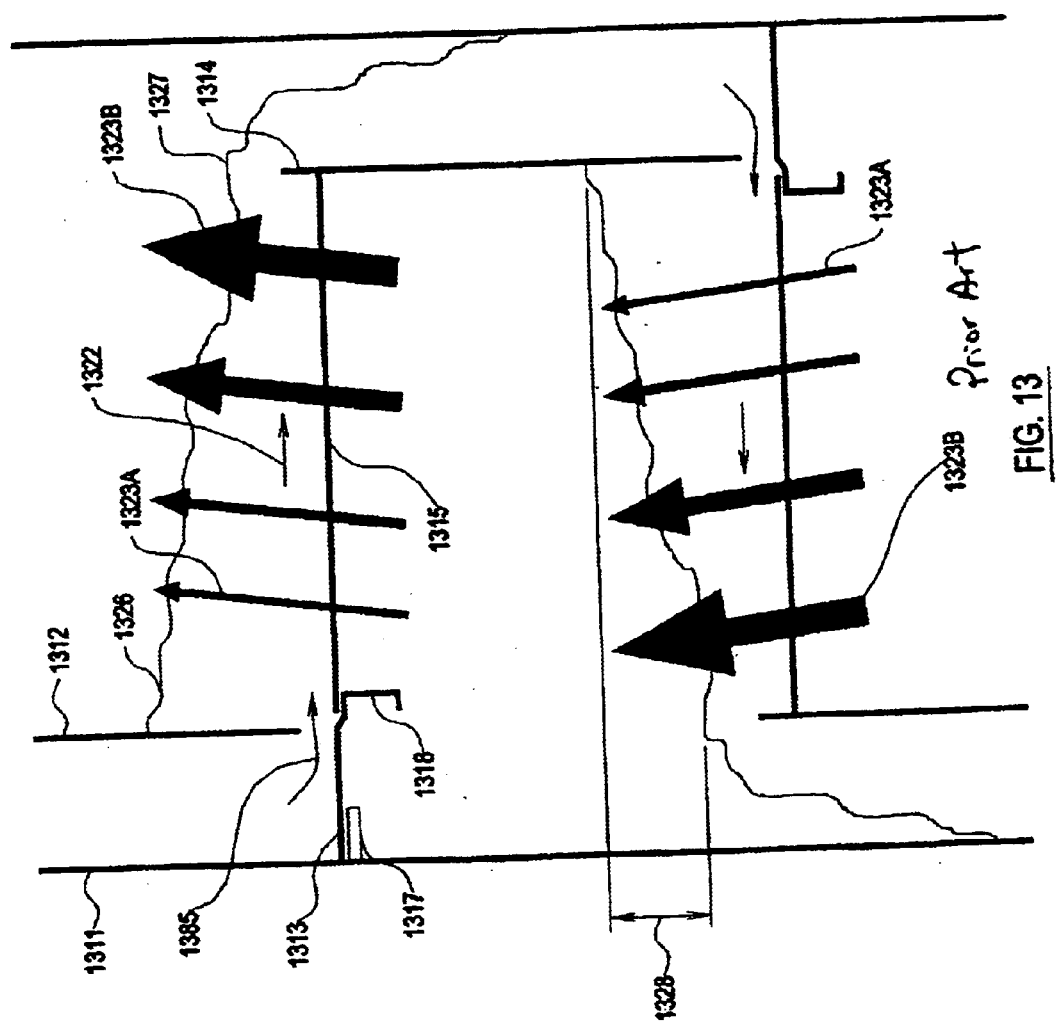
FIG. 13 demonstrates a typical liquid and vapor flow down a conventional column arrangement with a gradient across a tray deck causing a low vapor flow at an inlet portion of the tray deck and a high vapor flow at an outlet portion of the tray deck.

As shown in FIG. 13, a typical vapor stream and liquid flow within a distillation column with preexisting fractionation trays is depicted. Cylindrical vessel 1311 encloses two fractionation trays in the section of the column shown. Tray support ring 1317 supports and inlet section 1313 defined by an upper downcomer 1312 and is also supported a tray support beam 1318. Existing tray deck 1316 is support on support beam 1318 and has an weir outlet 1314. As demonstrated, the flow within the distillation column is maldistributed and non-uniform. As inlet downcomer flow 1385 enters the fractionation tray deck, it is subject to a gradient. A high gradient across tray deck 1315 is represented by liquid flow gradient 1328. This differential causes a low vapor flow at an inlet portion of the tray deck and a high vapor flow at an outlet portion of the tray deck. This prior art flow diagram shows a high inlet liquid flow height 1326 and low outlet liquid flow height 1327. Inlet vapor stream 1323A is smaller at the inlet portion of tray deck 1315 and larger at an outlet vapor stream 1323B forming a gradient which causes uneven vapor distribution and premature flooding in the downcomer which reduces tray capacity and efficiency. Flow 1322 becomes maldistributed leading to flooding where the higher pressure causes the liquid to back up into the downcomer and/or weeping where a higher pressure causes the liquid to flow through vapor openings to the fractionation tray deck below without going through the weir outlet and outlet downcomer.

Figure 14:
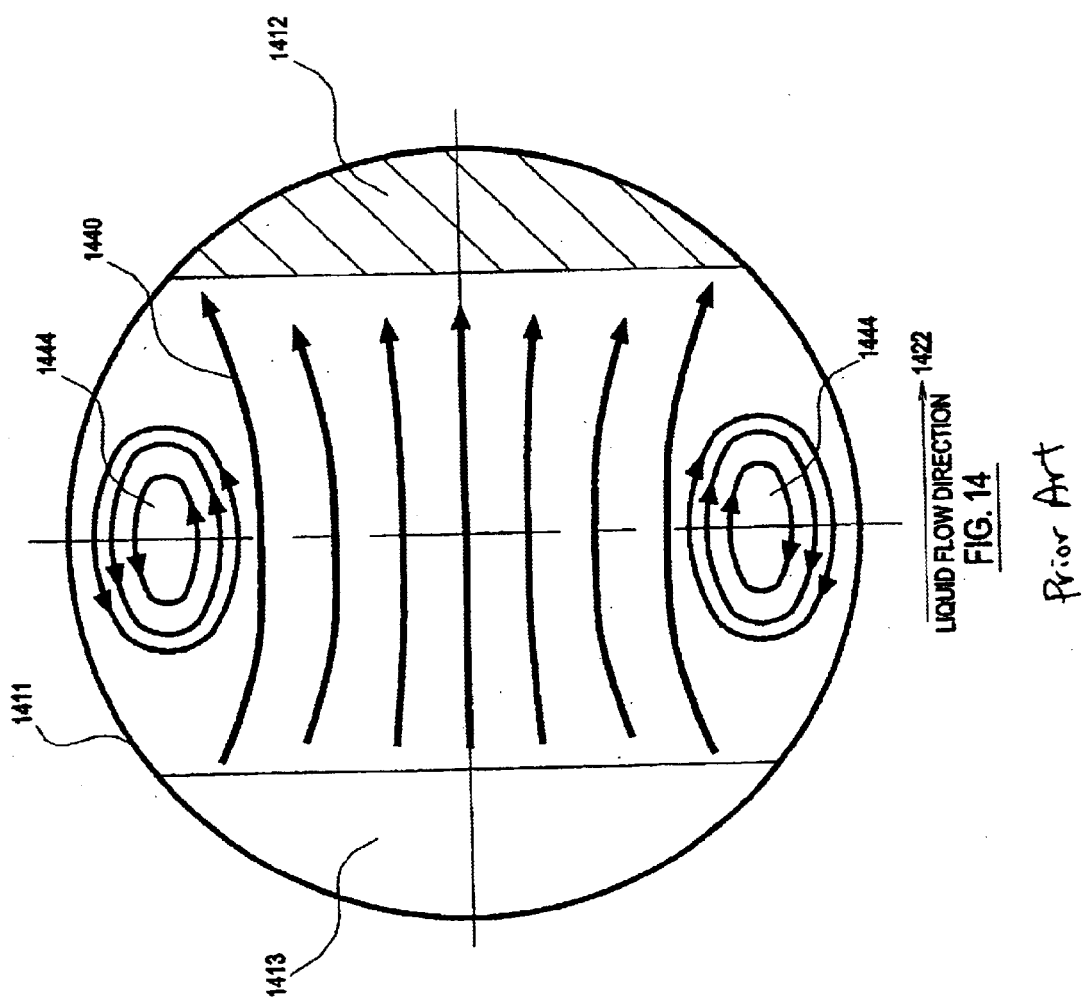
FIG. 14 is an overhead plan view demonstrating a flow reflux or back-flow across a non-modified preexisting tray deck.

FIG. 14 is an overhead plan view demonstrating a flow reflux or recirculation across a non-modified, existing tray deck. Vessel wall 1411 encloses the fractionation tray having an inlet section 1413 and an outlet downcomer 1412. Liquid flow 1440 depicts the flow of fluid across the tray deck from the inlet section 1413 to the outlet downcomer 1412 in a semi-uniform manner. While liquid flow 1440 follows the direction of liquid flow 1422, the liquid flow is maldistributed in that the flow is from an outer edge of the tray deck at the inlet section 1413 to an opposite outer edge near the vessel wall 1411. This causes a stagnant liquid flow 1444 which constantly recirculates to cause an inefficient fractionation process within the column. Flow 1440 is undesirable and is a major problem for which the revamps and debottleneck designs are trying to solve.

Figure 15:
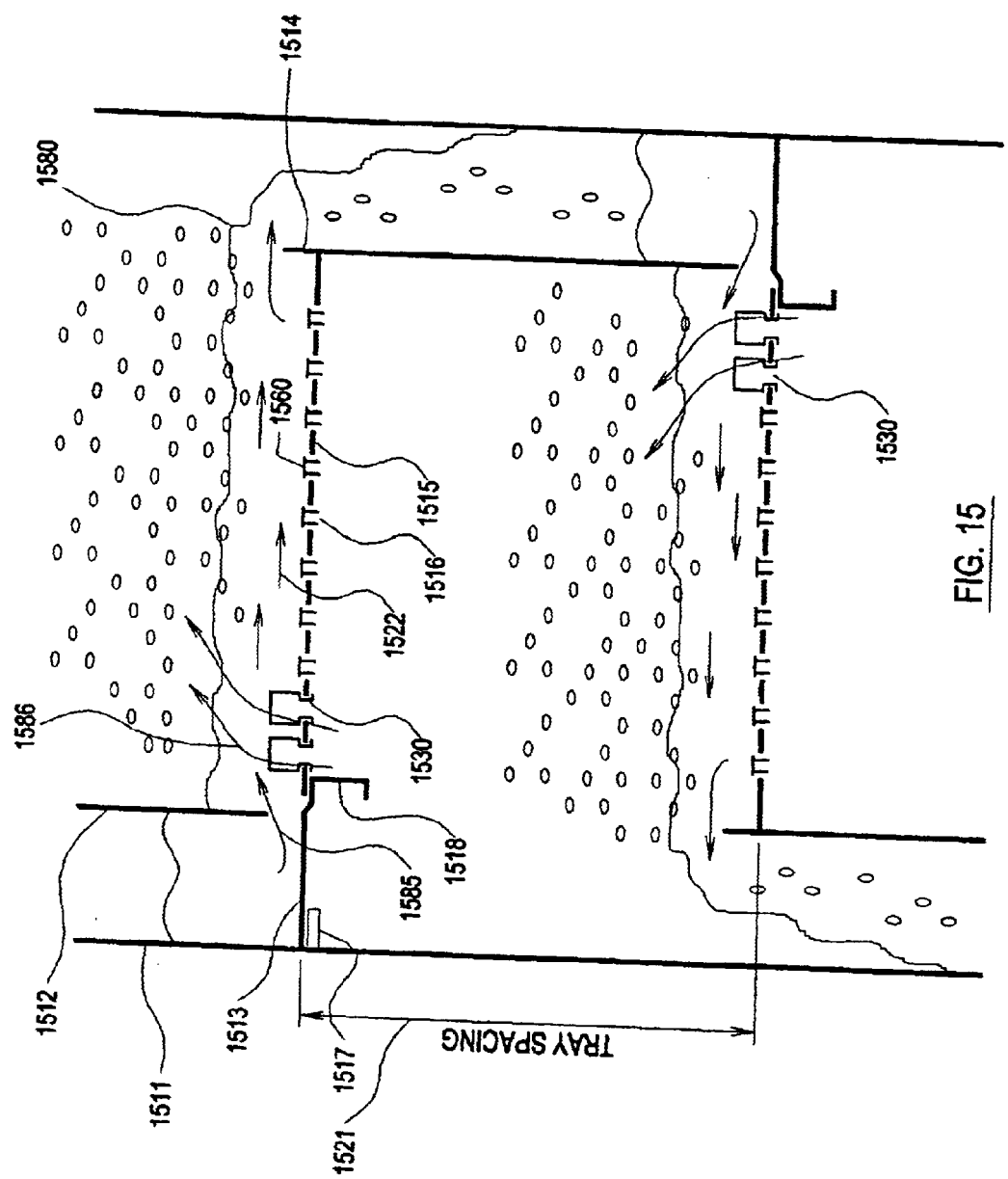
FIG. 15 illustrates an improved, uniform flow within a column, which has been revamped by the present invention.

As shown in FIG. 15, a simple schematic illustrates an improved fractionation process according to the present invention. The distillation column is shown with a section of two preexisting fractionation tray decks to demonstrate the flow over the improved column. Vessel wall 1511 defines an outer wall portion of the distillation column. Tray support ring 1517 supports an inlet section 1513 which is defined by upper downcomer 1512. A tray support beam 1518 also supports the inlet portion and may also be supported by support ring 1517. Tray deck 1515 has a multiplicity of vapor openings 1516 with conventional valves 1560 and has an weir outlet 1514 at an outlet or downstream portion of the tray deck. The liquid flow through the distillation column begins with a level of liquid in the inlet section 1513. Inlet flow 1585 passes over new inlet microdispersers 1530 located at or near the inlet section 1513 and interacts with a vapor stream 1586 through the microdispersers 1530. Uniform flow 1522 across the existing tray deck 1515 occurs due to the equalizing effect of the microdispersers. The fluid level 1580 across the entire deck is uniform across the fractionation tray, which has been converted and revamped by the present invention. There is no change in existing tray spacing 1521. Tray deck 1515, downcomer 1512 remains the same. This provides for a great savings in installation time, energy for manufacturing new internals and monetary and environmental resources by being able to reuse and recycle portions of the tower internals.

FIG. 16 depicts an overhead plan view of the desired, uniform flow over the revamped tray deck of FIG. 15. Vessel wall 1411 encloses the fractionation tray having an inlet section 1413 and an outlet downcomer 1412. Dotted line 1642 is the profile of a uniform plug flow regime wherein uniform liquid flow 1640, 1641 and 1643 denote the streamline flows in 1622 direction of flow. A plug flow regime has no backmixing in the direction of liquid flow, thus giving rise to little or no fluctuations in distillate concentration in either liquid or vapor stream across the entire tray deck. This desired flow pattern eliminates the stagnant recirculating liquid flow 1444 of FIG. 14 wherein the uniform liquid flow 1640, 1641 and 1643 across the tray deck moves efficiently without any maldistributions. This greatly increases the fractionation capacity and efficiency by removing any bottlenecks or flooded downcomers within the entire column.

Figure 17B:
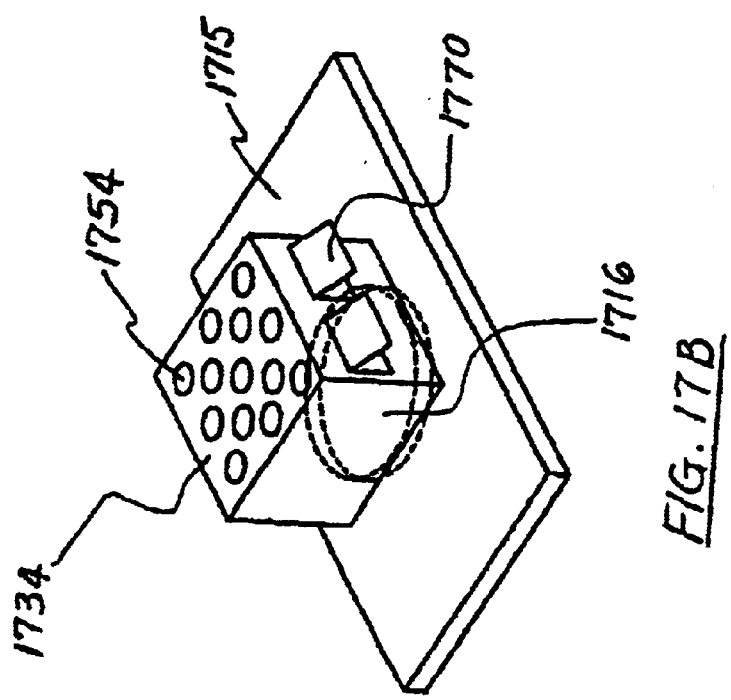
FIG. 17B is a perspective view of the microdisperser bubble promoter of FIG. 17A with downward optimizing tabs.
Figure 17A:
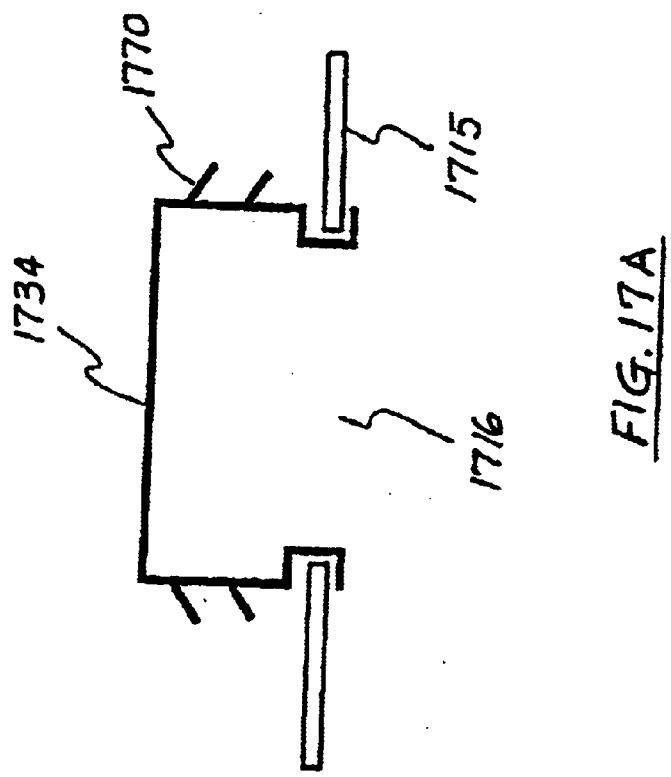
FIG. 17A is a cross sectional view of one embodiment of a conversion microdisperser bubble promoter with optimizing tabs.

Referring now to FIGS. 17A–B, an alternate embodiment of the microdisperser bubble promoters is disclosed. FIG. 17A is a cross sectional view of one embodiment of a conversion microdisperser bubble promoter with optimizing tabs. Optimizing microdisperser bubble promoter 1734 is inserted into tray deck 1715 through tray deck 1716. As shown, the individual optimizing promoter 1734 has downward deflecting tabs 1770. The deflecting tabs and promoter may be placed in an area of the tray deck with a very high liquid flow rate. One such area is under a multiple downcomer where a great volume of liquid is being dumped from an above fractionation tray. The deflecting tabs 1770 provide a shield canopy for allowing the vapor to flow through vapor opening 1716 from beneath the tray deck under the high flow rate. This allows fractionation to continue at or near the deflecting tabs 1770 without a major redesign of the inlet region under the multiple downcomer.

FIG. 17B is a perspective view of the microdisperser promoter of FIG. 17A with downward optimizing tabs. Optimizing microdisperser bubble promoter 1734 is inserted into tray deck 1715 through tray deck 1716. As shown, the individual optimizing promoter 1734 has downward deflecting tabs 1770. Additionally, vapor perforations 1754 are located on a top portion of the optimizing microdisperser bubble promoter 1734. The optimizing promoter in this embodiment may be placed in an area with a lighter liquid flow from the above fractionation tray such as under a segmented or conical downcomer. The vapor perforations 1754 provide for additional vapor-liquid interaction.

Figure 18A:
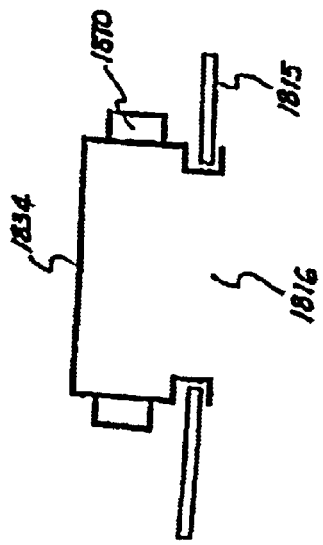
FIG. 18A is a cross sectional view of one embodiment of a conversion microdisperser bubble promoter with directional flow tabs.
Figure 18B:
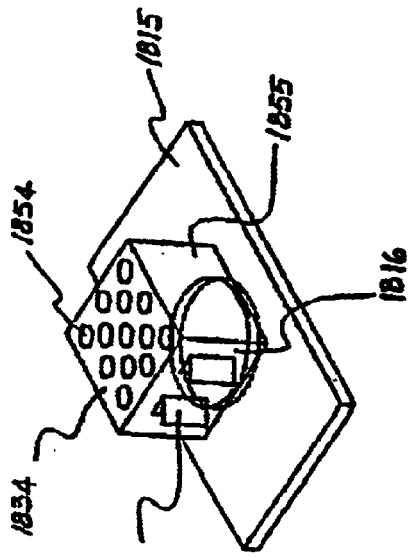
FIG. 18B is a perspective view of the microdisperser bubble promoter of FIG. 18A with directional flow tabs.
Figure 18C:
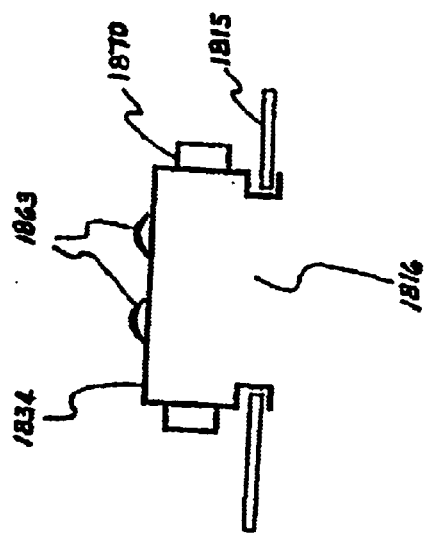
FIG. 18C is a cross section of one embodiment of a conversion microdisperser bubble promoter with directional flow tabs having a perforated deflector on the top.
Figure 18D:
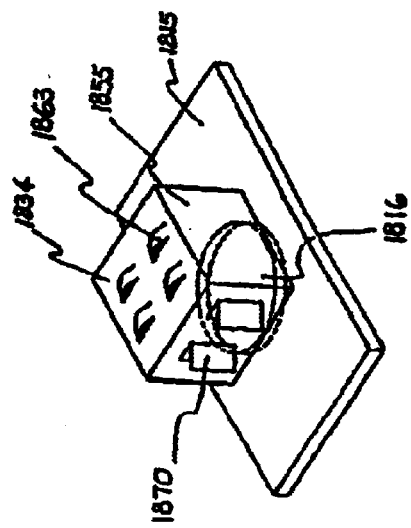
FIG. 18D is a perspective view of the microdisperser bubble promoter of FIG. 18C.

Turning now to FIGS. 18A–D, directional optimizing microdispersers are disclosed. FIG. 18A is a cross sectional view of one embodiment of a conversion microdisperser promoter with directional flow tabs. Directional optimizing microdisperser bubble promoter 1834 is a box-like structure having side directing tabs 1870. The directional promoter 1834 is inserted into tray deck 1816. By selecting and orienting a directional promoter, the vapor flow from beneath the tray deck may be optimized for a higher capacity and efficiency of vapor-liquid fractionation and mass transfer. FIG. 18B shows an additional embodiment where perforations 1854 are located in a top portion of promoter 1834. FIG. 18C is another embodiment where deflectors 1863 are in a top portion of promoter 1834 for use in a high liquid flow rate area. FIG. 18D is a isometric view of FIG. 18C showing the side directing tabs 1870 and top deflecting perforations 1863. One skilled in the art will appreciate that any combination of side directing tabs, top perforations, and deflecting perforations may be combined either individually or in combination throughout the fractionation tray to direct various flows in a uniform patter thereby eliminating maldistributed and stagnant flows.

Figure 19:
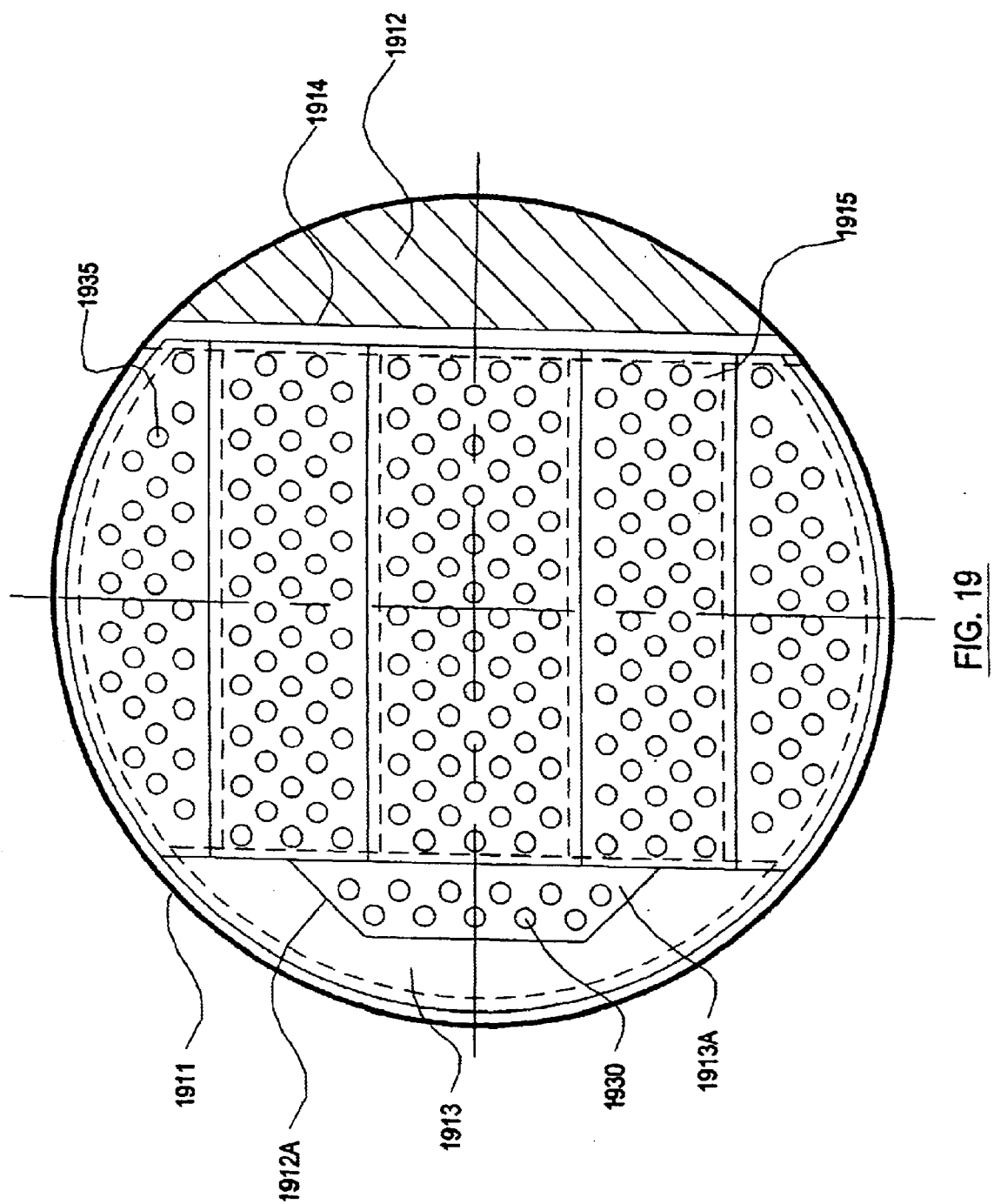
FIG. 19 is an overhead view of a modified conversion system, which retains the original tray deck panels and revamps a downcomer section and an inlet section in combination with conversion microdisperser bubble promoter and valves.

FIG. 19 is an overhead plan view of a modified conversion system of the present invention which retains the original tray deck panels and revamps a downcomer section and an outlet section in combination with conversion microdisperser bubble promoter and valves. High performance microdispersion valves 1935 are installed to replace conventional valves. Vessel wall 1911, inlet area 1913, outlet downcomer 1912, weir 1914 and existing tray panels 1915 remain the same. A new inlet downcomer panel 1912A is installed which can be segmented, cone shaped, directional or multiple involving different downcomers at the same fractionation tray level. The inlet section 1913A is modified such that microdispersers 1930 may be placed beneath the new downcomer panel 1912A to directionally distribute the fluid across the tray deck 1915. One skilled in the art will appreciate that a portion of the trays may be revamped in this manner such that a greater capacity and efficiency is achieved in incremental steps by replacing key fractionation tray decks at maintenance service intervals such that lower costs and speedier installations are provided.

FIG. 20A is an alternative embodiment of the present invention showing a microdisperser valve 2035 and a microdisperser bubble promoter 2034 installed in a sieve-type fractionation tray to increase the capacity and efficiency of such tray. A sieve tray is a type of distillation tray that has multiple openings or perforations which are smaller in size than conventional valve trays. Tray deck 2015 has multiple small perforations or vapor openings 2016. Preferably, microdisperser valve 2035 is configured to fit over a number of vapor openings 2016 as shown. Microdisperser valve 2035 has deflectors 2063 for deflecting vapor stream passing through vapor opening 2016. Microdisperser valve 2035 is connect through the vapor openings 2016 by quick connect legs 2065. Microdisperser bubble promoter 2034 is installed over multiple vapor openings 2016. Vapor openings 2053 allow vapor rising from beneath tray deck 2015 and through vapor openings 2016 to mix with the liquid flowing above the tray deck 2015.

FIG. 20B is a perspective view of an alternate microdisperser bubble promoter of FIG. 20A. The microdisperser bubble promoter 2034 has top perforations 2054 and side perforations 2053 for the passage of vapor. The bubble promoter 2034 covers multiple vapor openings 2016 in tray deck 2015. In this alternative embodiment, microdisperser bubble promoter 2034 is attached by legs 2068 and bolts 2069 to a respective sieve tray vapor opening 2016 or onto tray deck 2015. Concurrently, the microdisperser bubble promoter of FIG. 20B design can be readily adapted to be installed in a column of preexisting valve trays by bolting or other conventional attachment means.

While the sieve tray has many more perforations, the microdispersers according to the present invention allow for a preferential vapor flow and deflection at selected inlet and vessel wall areas. Each microdisperser covers several sieve tray vapor openings such that the liquid flow is deflected in a similar manner as the microdisperser bubble promoters and valves as discussed above. As the vapor passes through the microdisperser, the fluid/vapor contact time is increased to maximize the fractionation of the vapor and the liquid thus increasing the tray and column capacity and efficiency.

The apparatus of the present invention may also be included in a kit where a selection of various microdispersers is included. Conversion and spanning microdispersers along with microdispersion valves may be provided with attachment means such as bolts and nuts and if needed, hardware tools for removing existing valves and other worn-out or inefficient components and installing the microdispersers, respectively. The kit may be specially ordered by the end user for use in a specific column or part of a generic "laundry list" of available component parts to be mixed and matched according to instructions included in the kit and/or an optimizing diagram wherein the key placements of each of the microdispersers is shown. A computer software rating program may also be enclosed to calculate the optimal placement of each microdisperser such that the rate of flow and column operation is greatly increased.

Additionally, the method and apparatus of the present invention may be used in combination with a prior art-type revamp wherein most structures such as downcomers, inlet panel regions and weir outlets are completely redesigned and replaced. These replacement revamps can be high efficiency trays including multiple downcomer designs, packed towers and the like. One skilled in the art will appreciate that a portion of the trays may need to be totally revamped with new trays or packing materials to replace the original trays within the distillation column and/or only a partial revamp of some of the fractionation trays may be adapted according to the present invention.

Another area of the present invention application involves new "grass root" fractionation towers wherein a completely new tower is constructed from the beginning in a new location or as a part of existing plant expansion. The microdispersers of the present invention may be utilized to increase the capacity and efficiency of the fractionation column. By beginning with easy to replace microdispersers according to the present invention, any future revamps will be quicker and easier ultimately resulting in energy and resource savings while still maintaining a high capacity and efficiency within the distillation column.

The typical approach of revamping a fractionation column is a long and lengthy process. First, many approvals are required due to the high costs associated with a complete redesign and revamp involving large material and labor costs. The labor costs are high with a typical revamp due to the time involved in removing the old, existing column internals and installation of the new column internals in the field. The present invention reduces the costs by recycling many of the existing column internal components. Thus, a plant manager can install components according to a regularly scheduled maintenance cycle with minimum shut down time.

Furthermore, the typical revamp involving fabrication of new internals such as trays requires an additional amount of time where prior art revamp methods and apparatus require customized and specialized configurations of internals. More energy and production costs are required along with bulking packaging of new trays with an associated high transportation costs. The present invention allows for a readily available standard set or kit of conversion microdispersers available such that a quick shut down may allow for a quick installation without customization while still providing and increase in fractionation capacity and efficiency.

Moreover, replacement of the existing trays with new revamp structures requires special equipment such as lifting cranes to be arranged ahead of time for on site installation with the associated increase in the number of installation workers and workdays. Rental of special equipment and hiring of operator all add to the complexity of undertaking the revamp or modernization of the existing fractionation columns for the benefit of energy savings, product purity improvement and throughput increase. Further complications involve typical columns having a manway or portal configured as a small sized opening in either the top or bottom of a column. New tray decks are designed in sections to fit through these small openings. The present invention allows single installers without specialized equipment to be able to enter through the manway to install key components of microdispersers in target flow areas.

Furthermore, disposal of the scrap displaced tray material complicates the revamp in terms of proper waste disposal and environment safeguarding. The tower internals are often classified as hazardous waste due to the processing of volatile petrochemicals and other hydrocarbons. As a result, justification of revamping or debottlenecking any existing column of trays with the prior art high performance tray revamps has not been easy and approval by plant management is slow and time consuming due to the overriding concerns. With the present invention, the reuse and recycling on many components tower internals provides an economic method for increasing the column operation while minimizing costs including disposal and recycling costs.

On the other hand, it is of enormous economical benefit to hydrocarbon processing industries and operators when a revamp task can be undertaken without replacement of the existing trays in part or as a whole. Thus, the revamping of an existing column of trays becomes a simple, expedient and routine process and is achieved with less new material for fabrication and less scrap displaced material to disposal. Other advantages of the conversion system of the present invention include less quantity of new or displaced needing installation or removal, respectively, smaller and easier packaging of new material for shipment, quicker fabrication and delivery times, cheaper transport costs, less installation labor and workdays in addition to not requiring specialized equipment. By an estimate, the savings in total revamping cost can be more than half and the revamp task can be completed in a fraction of time than with the other approaches. Thus, modernization of the existing fractionation columns of trays utilizing a higher capacity and efficiency replacement conversion system of microdispersers can be readily justified as an immediate return on investment for revamp due to excellent operating cost reduction in terms of energy savings, product purity improvement and throughput increase.

As can be seen from the foregoing, the present invention provides a quick and cost effective solution for improving the efficiency and capacity of existing distillation columns. The present invention utilizes the preexisting structures within a column in combination with optimizing flow devices. The present invention increases fractionation throughput and efficiency while achieving the uniform flow pattern and reducing process plant operating costs. The present invention can be used for improving distillation columns in various hydrocarbon processing industries and other industries where a distillation process occurs.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for increasing fractionation capacity and efficiency of chemical compounds within a preexisting distillation column with a vessel having at least one preexisting fractionation tray deck with a multiplicity of openings, comprising:
a conversion microdisperser having a top wall and a side wall system adjacent to the top wall, the side wall system comprising a plurality of side walls, each side wall being located in one of a plurality of planes normal to the plane defined by the top wall, the top wall and each side wall of the side wall system having a plurality of apertures, the microdisperser configured to attach to the fractionation tray deck and overlie at least one of the multiplicity of openings such that vapor from beneath the tray deck flows through the microdisperser to interact with liquid flow above the tray deck.

2. The apparatus of claim 1 wherein the side wall system comprises two side walls each having a different number of the apertures.

3. The apparatus of claim 1 wherein the microdisperser is a valve.

4. The apparatus of claim 3 wherein the valve has a vapor deflecting perforation such that the vapor has greater contact with the liquid.

5. The apparatus of claim 1 wherein the microdisperser is a bubble promoter.

6. The apparatus of claim 1 wherein the microdisperser is configured to overlie at least two of the openings, the two openings separated by a beam supporting the fractionation tray deck.

7. The apparatus of claim 1 wherein the plurality of apertures of each side wall of the side wall system are spaced evenly from each other and distributed throughout each side wall.

8. The apparatus of claim 1 wherein the number of apertures of the top wall is greater than the number of apertures of any side wall of the side wall system.

9. The apparatus of claim 1 wherein the top wall has at least six apertures for each of the at least one of the multiplicity of openings.

10. The apparatus of claim 1 wherein the plurality of apertures of the top wall define a plurality of groups each having a different number of apertures, wherein the groups are separated from one another by a distance greater than a maximum distance between any two adjacent apertures within a particular group.

11. The apparatus of claim 5 wherein the bubble promoter has at least one vapor deflecting perforation such that the vapor has greater contact with the liquid.

12. The apparatus of claim 1 wherein the microdisperser is configured to attach to the fractionation tray deck and overlie two or more openings of the tray deck.

13. The apparatus of claim 2 wherein the total number of apertures defined by the top wall is greater than the total number of apertures defined by the side wall system.

14. The apparatus of claim 1 wherein the plurality of apertures of the top wall are spaced evenly from each other and distributed throughout the top wall.

15. The apparatus of claim 1 wherein the microdisperser is configured to be installed at or near a tray support beam.

16. The apparatus of claim 1 wherein at least one of the apertures of the top wall and at least one of the apertures of the side wall system are different in size.

17. An apparatus for increasing fractionation capacity and efficiency of chemical compounds within a pre-existing distillation column with a vessel having at least one pre-existing fractionation tray deck with a multiplicity of openings, comprising:
a conversion microdisperser having a top wall and at least two side walls, the top wall being located in a first plane and each of the at least two side walls being located in one of a plurality of planes normal to the first plane, the top wall and each of the at least two side walls having a plurality of apertures, the microdisperser configured to attach to the fractionation tray deck and overlie at least one of the multiplicity of openings such that vapor from the tray deck flows through the microdisperser to interact with liquid flow above the tray deck.

18. The apparatus of claim 17 wherein the microdisperser is a valve.

19. The apparatus of claim 18 wherein the valve had a vapor deflecting perforation such that the vapor has greater contact with the liquid.

20. The apparatus of claim 17 wherein the microdisperser is a bubble promoter.

21. The apparatus of claim 17 wherein the microdisperser is configured to overlie at least two of the openings, the two openings separated by a beam supporting the fractionation tray deck.

22. The apparatus of claim 17 wherein the plurality of apertures of the at least two side walls are spaced evenly from each other and distributed throughout the at least two side walls.

23. The apparatus of claim 17 wherein the number of apertures of the top wall is greater than the number of apertures on any one of the at least two side walls.

24. The apparatus of claim 17 wherein the top wall has at least six apertures for each of the at least one of the multiplicity of openings.

25. The apparatus of claim 17 wherein the plurality of apertures of the top wall define a plurality of groups each having a different number of apertures wherein the groups are separated from one another by a distance greater than a maximum distance between any two adjacent apertures within a particular group.

26. The apparatus of claim 20 wherein the bubble promoter has at least one vapor deflecting perforation such that the vapor has greater contact with the liquid.

27. The apparatus of claim 17 wherein the microdisperser is configured to attach to the fractionation tray deck and overlie two or more openings of the tray deck.

28. The apparatus of claim 17 wherein the total number of apertures defined by the top wall is greater than the total number of apertures defined by all of the side walls.

29. The apparatus of claim 17 wherein the plurality of apertures of the top wall are spaced evenly from each other and distributed throughout the top wall.

30. The apparatus of claim 17 wherein the microdisperser is configured to be installed at or near a tray support beam.

31. The apparatus of claim 17 wherein at least one of the apertures of the top wall and at least one of the apertures of the at least two side walls are different in size.

* * * * *